US012033328B2

(12) United States Patent
Silbert et al.

(10) Patent No.: US 12,033,328 B2
(45) Date of Patent: Jul. 9, 2024

(54) METHOD FOR SEGMENTATION OF THE HEAD-NECK ARTERIES, BRAIN AND SKULL IN MEDICAL IMAGES

(71) Applicant: ALGOTEC SYSTEMS LTD., Ra'Anana (IL)

(72) Inventors: Ohad Silbert, Rehovot (IL); Reuven Shreiber, Haifa (IL); Guy Engelhard, Kiryat Ono (IL); Hadar Porat, Tel-Aviv (IL); Tiferet Gazit, Tel-Aviv (IL)

(73) Assignee: PHILIPS MEDICAL SYSTEMS TECHNOLOGIES LTD, Haifa (IL)

( * ) Notice: Subject to any disclaimer, the term of this patent is extended or adjusted under 35 U.S.C. 154(b) by 482 days.

(21) Appl. No.: 17/247,644

(22) Filed: Dec. 18, 2020

(65) Prior Publication Data

US 2021/0110547 A1 Apr. 15, 2021

Related U.S. Application Data

(60) Continuation of application No. 16/100,255, filed on Aug. 10, 2018, now Pat. No. 10,885,633, which is a division of application No. 14/602,307, filed on Jan. 22, 2015, now Pat. No. 10,068,340.

(60) Provisional application No. 62/074,223, filed on Nov. 3, 2014.

(51) Int. Cl.
*G06T 7/11* (2017.01)

(52) U.S. Cl.
CPC ...... *G06T 7/11* (2017.01); *G06T 2207/10081* (2013.01); *G06T 2207/20036* (2013.01); *G06T 2207/20156* (2013.01); *G06T 2207/30101* (2013.01)

(58) Field of Classification Search
CPC ............ G06T 7/11; G06T 2207/10081; G06T 2207/20036; G06T 2207/20156; G06T 2207/30101
See application file for complete search history.

(56) References Cited

U.S. PATENT DOCUMENTS

| 7,567,696 | B2* | 7/2009 | Moreau-Gobard ....... G06T 7/12 382/131 |
| 8,229,186 | B2 | 7/2012 | Milstein |
| 8,352,174 | B2 | 1/2013 | Milstein |
| 8,837,771 | B2* | 9/2014 | Lay .......................... G06T 7/11 378/4 |
| 2005/0063579 | A1 | 3/2005 | Lee |
| 2006/0167437 | A1 | 7/2006 | Valencia |

(Continued)

*Primary Examiner* — Wesley J Tucker

(57) ABSTRACT

A method for automated segmentation of a blood vessel of a head and neck of a subject in a medical image, the method comprising: identifying the location of anatomical landmarks in the medical image; identifying regions of interest in the medical image based on the landmarks; segmenting segments of blood vessels in the medical image; classifying at least one of the segments as defining the blood vessel based on its position relative to the landmarks within the regions of interest to create a classified blood vessel; identifying a starting seed for the blood vessel from the classified blood vessel; identifying an ending seed for the blood vessel from the classified blood vessel; segmenting the blood vessel between the starting seed and the ending seed; and defining a path between the starting seed and the ending seed.

20 Claims, 32 Drawing Sheets

(56) References Cited

U.S. PATENT DOCUMENTS

| | | | |
|---|---|---|---|
| 2007/0165917 A1* | 7/2007 | Cao | G06T 7/0012 382/128 |
| 2008/0025584 A1 | 1/2008 | Kunz | |
| 2008/0137929 A1* | 6/2008 | Chen | G06T 17/20 382/131 |
| 2008/0177280 A1* | 7/2008 | Adler | A61B 90/10 901/41 |
| 2008/0188962 A1* | 8/2008 | Suryanarayanan | G06V 10/457 700/89 |
| 2008/0273779 A1 | 11/2008 | Pekar | |
| 2008/0279435 A1* | 11/2008 | Arnold | G06T 7/0012 382/131 |
| 2008/0317314 A1* | 12/2008 | Schwartz | G06T 7/0012 382/131 |
| 2009/0185753 A1* | 7/2009 | Albu | G06T 5/008 382/260 |
| 2009/0208078 A1* | 8/2009 | Fritz | G06T 7/42 382/130 |
| 2010/0128940 A1* | 5/2010 | Buelow | G06T 7/155 382/128 |
| 2010/0310146 A1* | 12/2010 | Higgins | G06T 7/162 345/419 |
| 2011/0222750 A1 | 9/2011 | Liao | |
| 2012/0134564 A1 | 5/2012 | Zheng | |
| 2013/0016092 A1 | 1/2013 | Collins | |
| 2014/0294269 A1* | 10/2014 | Mohr | G06T 7/155 382/131 |
| 2015/0131880 A1* | 5/2015 | Wang | G06T 3/0075 382/131 |
| 2015/0324977 A1* | 11/2015 | Magrath | G06T 7/12 382/128 |
| 2015/0339847 A1 | 11/2015 | Benishti | |
| 2016/0174902 A1 | 6/2016 | Georgescu | |
| 2016/0328855 A1* | 11/2016 | Lay | G06V 10/7715 |
| 2017/0337343 A1* | 11/2017 | Kakadiaris | G16Z 99/00 |
| 2018/0199997 A1 | 7/2018 | Pinto | |
| 2021/0137634 A1* | 5/2021 | Lang | A61B 5/113 |
| 2022/0370033 A1* | 11/2022 | Klingensmith | G06T 7/0012 |

* cited by examiner

METHOD FOR SEGMENTATION OF THE HEAD-NECK ARTERIES, BRAIN AND SKULL IN MEDICAL IMAGES

CROSS REFERENCE TO RELATED APPLICATIONS

This application is a Continuation of U.S. Ser. No. 16/100,255 filed Aug. 10, 2018, which is a Divisional of U.S. Ser. No. 14/602,307, filed on Jan. 22, 2015, which claims priority to U.S. Ser. No. 62/074,223 provisionally filed on Nov. 3, 2014, These applications are hereby incorporated by reference herein.

FIELD OF THE INVENTION

The present disclosure relates to a system and method for medical image manipulation and in particular, such a system and method for segmenting the brain, the skull and segmentation of the head-neck arteries in medical images.

BACKGROUND OF THE INVENTION

CT (computed tomography) imaging systems can be used by radiologists to examine the blood vessels of the head and neck including degree of stenosis (narrowing) or aneurisms. Radiologists analyze the vessels in two scenarios. In one scenario each vessel is examined separately, traversing along the vessel and checking for aneurisms or stenosis. The second method is by using a MIP (Maximum Intensity Projection) view of the head and examining the overall structure of the blood vessels.

For the first scenario, a method for finding the centerline of each vessel is needed, while for the second scenario, it is desirable to have a view of the head without the intervening skull so as to get a good view of the various vessels. To implement the above two scenarios, segmentation algorithms for blood vessels, the brain, and the skull need to be developed. Once these are in place a radiologist can choose to display the blood vessels only with the skull and brain effectively removed from the image. The segmentation process as it relates to CT images involves using computational algorithms to identify parts and systems within the scanned human body. Segmented items can, for example, be highlighted, labeled or removed from the image.

Identification/segmentation of the head-neck arteries in a CT image allows a radiologist to examine each of the blood vessels in a panoramic view and to traverse along the vessel showing cross sectional views of the vessels that allow accurate measurements of the diameter and cross sectional area of the arteries as well as various aneurism and stenosis measurements.

It is noted that determination of the blood vessels versus other unrelated elements in the CT image is generally not a trivial task. In many cases parts of the blood vessel are missing from the scan, have non-uniform CT numbers (Hounsfield numbers) and/or the edges of the blood vessels are not clear. Exemplary reasons for this are:

a) Even if the blood vessel is imaged using an intravenous radiocontrast agent, this material may not be uniformly distributed along the blood vessel;
b) Partial volume effects, especially near bones;
c) Nearby tissue with similar absorption, mainly various bones that have similar HU values;
d) Narrowing, splitting and/or other geometrical properties of vessels;
f) Nearby vessels may appear to meet and merge and then diverge;
g) Various effects may cause a vessel to appear to include loops;
h) Occlusions;
i) Some slices may be scanned before the injection of the contrast agent, while other slices are scanned after the injection;
j) Noise.

Prior art segmentation tools have generally required at least some manual user input, such as identifying the starting point and ending points of the neck arteries, and segmenting each image can therefore require a lot of time by skilled professionals, making it impractical to routinely segment large numbers of medical images.

It is therefore desirable to provide a method for segmentation of the head-neck arteries that is fully automated.

SUMMARY OF THE INVENTION

The present invention overcomes the deficiencies of the background art by providing a system and method, in at least some embodiments, for automated segmentation of the head-neck arteries, the brain and the skull in CT images.

According to at least some embodiments of the present invention, there is provided a method for automated segmentation of a segment of a blood vessel of a subject in a medical image comprising volumetric data, comprising: segmenting circular components in parallel planes of the volumetric data; and for each of the circular components, identifying corresponding circular components from the circular components in adjacent planes to define a contiguous segment of corresponding circular components spanning a plurality of the planes; wherein the contiguous segment defines a segment of a blood vessel.

Preferably the corresponding circular components are defined by a maximal overlap of the circular components. Alternatively the corresponding circular components are defined by closeness of the center of mass of the circular components. Preferably the medical image is a CT scan and the circular components are identified from the intersection of a wide HU range and a narrow HU range.

According to a further embodiment of the present invention, there is provided a method for automated segmentation of a blood vessel of a head and neck of a subject in a medical image, the method comprising: identifying the location of anatomical landmarks in the medical image; identifying regions of interest in the medical image based on the landmarks; segmenting segments of blood vessels in the medical image; classifying at least one of the segments as defining the blood vessel based on its position relative to the landmarks within the regions of interest to create a classified blood vessel; identifying a starting seed for the blood vessel from the classified blood vessel; identifying an ending seed for the blood vessel from the classified blood vessel; segmenting the blood vessel between the starting seed and the ending seed; and defining a path between the starting seed and the ending seed.

Preferably the blood vessel comprises the right internal and common carotid artery, the left internal and common carotid artery, the right external carotid artery, or the left external carotid artery.

Preferably the blood vessel comprises the right vertebral artery or the left vertebral artery wherein the region of interest comprises a segmented left and right internal carotid artery and segmented basilar artery. Preferably the region of interest is defined based on the relative position of the segmented carotid artery in each slice where the segmented carotid artery is located and in the slices where the brain is segmented.

Preferably the blood vessel comprises at least one of the basilar artery, the aortic arch, or a blood vessel in the brain.

Preferably the image comprises a plurality of slices, the method further comprising: automatically identifying a plurality of landmark slices containing each of the anatomical landmarks in the medical image, wherein the landmarks comprise at least one of the lungs, trachea, brain, skull, or segmented blood vessels; automatically identifying relevant landmark slices for finding the blood vessel based on the positional relationships of the landmarks and the blood vessel; and manually identifying a starting seed for the blood vessel from within a set of slices that is constrained to the relevant landmark slices if the identifying a starting seed fails.

Preferably the method further comprises identifying the skull orientation. Preferably, the medical image comprises volumetric data.

Preferably segmenting segments of blood vessels comprises: segmenting circular components in parallel planes of the volumetric data; and for each of the circular components, identifying corresponding circular components from the circular components in the adjacent planes to define a contiguous segment of corresponding circular components spanning a plurality of the planes; wherein the contiguous segment defines a segment of a blood vessel. Preferably the corresponding circular components are defined by a maximal overlap of the circular components. Alternatively, corresponding circular components are defined by closeness of the center of mass of the circular components. Preferably the medical image is a CT scan and the circular components are identified from the intersection of a wide HU range and a narrow HU range.

Preferably the medical image comprises a plurality of slices. Preferably the identifying of the anatomical landmarks further comprises: initial segmentation of the lungs comprising locating the upper lung slice; initial segmentation of the brain comprising locating the brain base slice; segmentation of the skull comprising locating the skull base slice; and initial segmentation the trachea further comprising determining the center of the neck on the axial plane, wherein the bottom of the trachea is in the upper lung slice.

Preferably the regions of interest comprise at least one of: the region between the upper lung slice and the brain base slice; the brain, the region above the skull base slice, or the region between the upper lung slice and the skull base slice. Preferably, the blood vessel is defined as being on the right or the left of the subject based on at least one of the center of the neck, the center of the image, or the skull orientation.

Preferably the image is obtained after injection of an intravenous radiocontrast agent into the subject.

According to a further embodiment of the present invention, there is provided a method for semi-automated identification of a seed for segmentation of a blood vessel of a head and neck of a subject in a medical image wherein the image comprises a plurality of slices, the method comprising: automatically identifying anatomical landmarks and the plurality of landmark slices containing each of the anatomical landmarks in the medical image; automatically identifying relevant landmark slices for finding the blood vessel based on the positional relationships of the landmarks and the blood vessel; and manually identifying the seed for the blood vessel from within a set of slices that is constrained to the relevant landmark slices. Preferably the landmarks comprise at least one of the lungs, trachea, brain, skull, or segmented blood vessels.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DETAILED DESCRIPTION OF THE EMBODIMENTS

Figure 1:
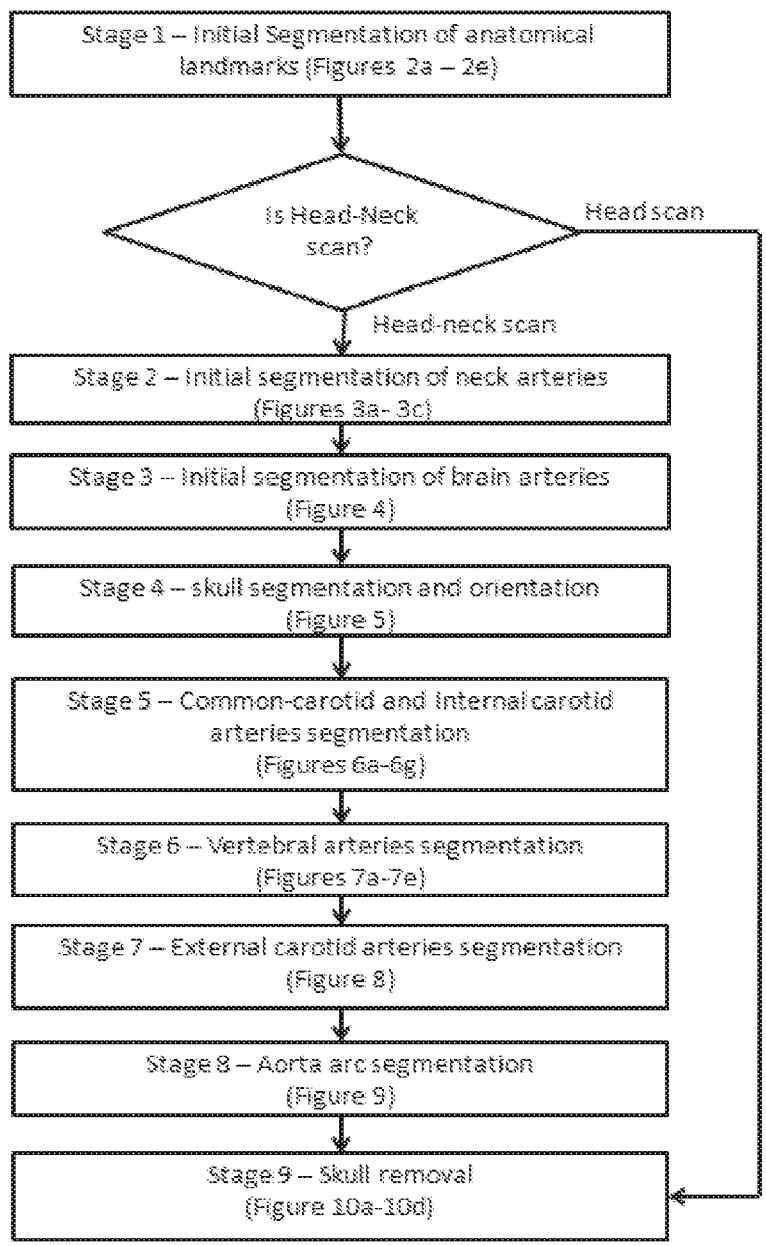
FIG. 1 is a flowchart of an exemplary, illustrative method for brain segmentation and head-neck artery segmentation in a CT scan according to at least some embodiments of the present invention.

The present invention provides a system and method, in at least some embodiments, for manipulation of head-neck CT scan images to automatically segment the brain and the head-neck arteries preferably including the main head-neck arteries: the common, internal and external carotid arteries, the vertebral arteries on the left and right side, the aortic arch, and the basilar artery. Optionally, a user aided recovery process is provided in case the automated method fails that allows the automated method to continue after some manual input. The algorithms and methods described are optimized to enable automated segmentation in a minimum amount of time.

The resulting segmentation preferably enables display and labeling on a medical image viewer of the head-neck arteries and further preferably enables removal from the displayed image of the brain, skull, vertebral bones and all other bones in the image along with any other non-brain soft tissue, air cavities and any other parts of the image that do not constitute part of the desired segmented arteries such as unsegmented blood vessels. Other arteries of the head may optimally be segmented and displayed as part of the method.

The method described below is preferably performed in an iterative manner and includes multiple stages of preliminary identification and segmentation of anatomical landmarks and points of interest followed by refinements of these, which may include analysis, marking, repetition or deletion, until the desired segmentation has been accomplished. Optionally, the methods described are based on partial segmentations that have already been performed.

Within these stages and throughout the description below, the proposed values used to accomplish these identifications, segmentations and refinements are those found most useful by the inventors and should not be considered limiting.

The methods and algorithms described herein preferably use the volumetric data set from the image or medical image or scan or CT scan (terms used interchangeably) data, where the volumetric data set includes voxel values that are in Hounsfield units. The Hounsfield units (HU) system is a linear transformation scale from the attenuation coefficient to a scale where air has the value −1000 and water is zero. This scale in CT images has the value range −1000 (air)-3000 (dense bones).

While CT scans generally comprise axial slices of voxels, the volumetric data may be "sliced" into axial, sagittal or coronal planes depending on the spatial positioning of the blood vessel that is being segmented. Operation may be carried out in two-dimensional (2d) or three-dimensional (3d) planes or slices.

The term "component" as used herein refers to a group of voxels where each voxel can be reached from any other voxel in the group by traveling along adjacent voxels. These may be in one specific plane or may span several contiguous planes. These components may be classified as part of the algorithm and may represent any anatomical feature captured in the scan including segments of blood vessels, or parts of anatomical landmarks.

The terms "Dilate", "Erode", "Opening", "Closing" and "Structure Element" as used herein refer to the standard morphological terms as is known in the art.

The term "Fill Cavity" as used herein refers to the process of adding all voxels that are completely surrounded by segmented voxels. The operation is carried out in a two dimensional plane.

The image manipulation and algorithm described here is preferably performed on head-neck CT scans of a patient injected with an intravenous radiocontrast agent. Head-neck CT images preferably start at the upper part of the chest and end at the top of the head. Alternatively, the methods may be performed on a CT of the head only scan as will be described below. Optionally, the methods may be used on other types of medical images. Optionally, the methods may be applied to segmentation of blood vessels, including both arteries and veins, in any anatomical area of the body. Optionally, the subject of the medical image may be non-human.

The segmentation is preferably completely automated and involves the following general stages which are described in extensive detail with reference to the figures below:

Anatomical landmarks—such as the lungs, brain, skull, or blood vessels are located in the image. These are further refined to find the upper lung slice; the brain base slice; the skull base slice; and the trachea to determine the center of the neck on the axial plane;

Regions of interest are defined based on these anatomical landmarks including: the region between the upper lung slice and the brain base slice; the brain, the region above the skull base slice, or the region between the upper lung slice and the skull base slice. Additional regions of interest are preferably defined based on segmented arteries in order to segment other arteries;

Segments of blood vessels are segmented. This process preferably includes segmentation of circular components in parallel planes of the volumetric data making up the image. Contiguous circular components are then found in adjacent planes, either based on overlapping of the circular components or based on the closeness of the center of mass of these components. These contiguous components define the blood vessels. The vessel segmentation makes use of both narrow and wide HU ranges as described below;

The segmented blood vessels are preferably classified based on their location in a region of interest relative to the landmarks described above. The main blood vessels classified and segmented by the process as described herein preferably include the right and left internal, external and common carotid arteries, the right and left vertebral arteries, the basilar artery, the aortic arch, and other blood vessels in the brain. Preferably, the classification of blood vessels as being on the right or left is based on the neck centerline as described above, or the center of the image, or the skull orientation or a combination of these. Optionally, the method may be used to segment other blood vessels from other parts of the body;

Starting and ending seeds are preferably chosen from the classified blood vessels allowing final segmentation of the blood vessel including all of its segments and allowing definition of the vessel path using path mapping tools as described herein.

Optionally, should part of the automated process fail, a semi-automated process is used to recover the automated process. The semi-automated process requires user input to locate blood vessel seeds that were not located automatically. The user is preferably assisted and given a choice of slices that is limited to the most relevant slices based on the landmarks as described above. The semi-automated process is therefore optimized to allow the fastest, most effective manual input.

Referring now to the drawings, FIG. 1 is a flowchart of an exemplary, illustrative method for brain segmentation and head-neck artery segmentation in a CT scan according to at least some embodiments of the present invention. FIG. 1 shows the primary stages of the method, each of which is described with reference to the figures that follow. As shown in Stage 1 the main anatomical landmarks in the CT scan are segmented for use in later stages. The main anatomical landmarks preferably include the brain, the lungs and the trachea. In addition after segmenting the carotid arteries, these will serve as anatomical landmarks for the segmentation of the vertebral arteries. In addition, the CT bed on which the patient is lying is also segmented in order to distinguish it from the patient's body. Stage 1 is further described with reference to FIGS. 2a-2e below.

Before Stage 2 commences, it is determined whether the scan is a head-neck scan or a head scan only. If the scan is a head-neck scan then the method proceeds to Stage 2. If the scan is a head scan then the method proceeds to Stage 9.

In Stage 2 an initial segmentation of the neck arteries is performed. Stage 2 is further described with reference to FIGS. 3a-3c below.

In Stage 3 an initial segmentation of the brain arteries is performed. Stage 3 is further described with reference to FIG. 4 below.

Stage 4 includes skull segmentation and a determination of the skull orientation. Stage 4 is further described with reference to FIG. 5 below.

In Stage 5 the segmentation of the common carotid and internal carotid arteries is performed. Stage 5 is further described with reference to FIGS. 6a-6g below. In Stage 5 the start and end seeds for the right and left internal carotid arteries are selected. Seeds in this context refer to voxels in the scanned image that match specific criteria that places them with a high degree of certainty in an area representing the body segment that needs to be identified. The seeds chosen here represent the most likely start and end points of the arteries in the CT scan. The starting seed is the lowest voxel in the common carotid volume, while the ending seed is chosen, from various candidates in the brain; to have the lowest normalized path cost as is known in the art.

In Stage 5 the right and left internal carotid arteries are segmented by feeding the seeds to a thin vessel segmentation algorithm as in known in the art such as U.S. Pat. No. 8,229,186 filed Dec. 26, 2004, the entire disclosure of which is hereby incorporated by reference and for all purposes in its entirety as if fully set forth herein. The algorithm uses improved local path cost that takes into account calculations from prior stages. The segmentation of the internal carotid also includes the segmentation of the common carotid in the neck since the starting seed is the lowest voxel in the common carotid volume.

In Stage 6 the vertebral arteries are segmented. This is preferably done using the standard thin-vessel tool segmentation algorithm as referenced above. The input seeds are set automatically by identifying parts of the vertebral arteries and the basilar artery, and the local cost is modified using initial segmentation and using some anatomic knowledge, incorporating knowledge from the already segmented carotid arteries. Stage 6 is further described with reference to FIGS. 7a-7e below.

In Stage 7 the external carotid arteries are segmented. This is done by expanding the initial artery segmentation, selecting starting seeds using the seed in the common carotid, and an ending seed in the expanded artery segmentation, and segmenting the vessel passing between these seeds. Stage 7 is further described with reference to FIG. 8 below.

In Stage 8 a segmentation of the aorta arc is performed. Stage 8 is further described with reference to FIG. 9 below.

In Stage 9 the skull bones and any other voxels outside the brain are segmented, excluding all the arteries that were segmented in the previous stages. Stage 9 is further described with reference to FIGS. 10a-10d below.

Figure 2A:
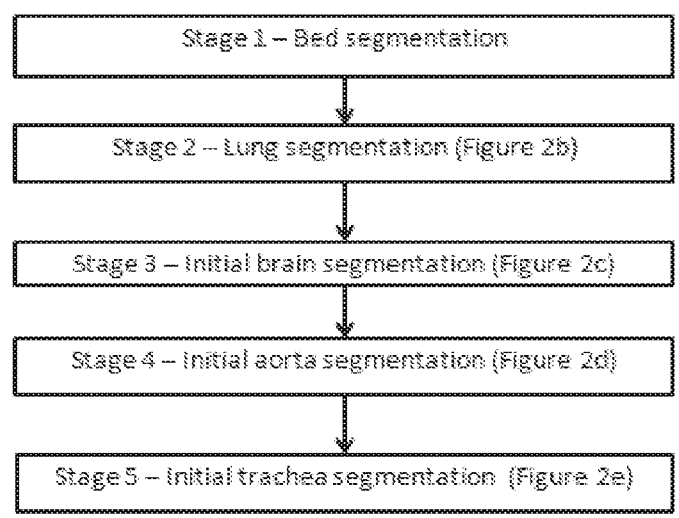
FIG. 2a is a flowchart of an exemplary, illustrative method for segmenting anatomical landmarks in a head-neck CT scan according to at least some embodiments of the present invention.

Reference is now made to FIG. 2a which is a flowchart of an exemplary, illustrative method for segmenting anatomical landmarks in a head-neck CT scan according to at least some embodiments of the present invention. The process shown in FIG. 2a results in initial segmentation of various elements in the scan, together with the identification of several points that will be used in later stages. As noted before, both for this figure and throughout the specification, proposed values are those found most useful by the inventors and should not be considered limiting. Stages 2-5 deal with segmentations of anatomical landmarks that are used in later stages of the algorithm while Stage 1 segments the bed.

In Stage 1, the bed, on which the patient is lying, is segmented and removed from the scan. The removal of the bed from the scan is done using a standard bed segmentation tool as is known in the art.

In Stage 2 the lungs and the uppermost slice of the scan containing the lungs is located. This upper lung slice will be used in later stages to locate the bottom of the trachea. Since only head-neck scans are considered here, only the lower third of the scan is taken into account. An optional method that has been found to be useful by the inventors for locating the upper slice of the lung is described below with reference to FIG. 2b Stages 2a-2e, however other methods known in the art may also be suitable.

An initial segmentation of the brain is needed for the algorithm to identify the location of the head blood vessels. The brain segmentation makes use of the brain's unique Hounsfield value range (roughly 0 to 100 Hounsfield) and its size. An optional method for the initial segmentation that has been found to be useful by the inventors is described below with reference to FIG. 2c Stages 3a-3j, however other methods known in the art may also be suitable.

Similarly, an initial segmentation of the aorta is performed in Stage 4. An optional method for the initial segmentation that has been found to be useful by the inventors is described below with reference to FIG. 2d Stages 4a-4i, however other methods known in the art may also be suitable.

The initial segmentation of the trachea is described in Stage 5 which is further described with reference to FIG. 2e, Stages 5a-5e. The segmentation is only partial, since the trachea position is used only to determine the central location of the neck. Vessels on its right are regarded as being on the right side, and vessels on its left are regarded as being on the left side. Here too, an optional method for the partial segmentation that has been found to be useful by the inventors is described below with reference to FIG. 2e, Stages 5a-5e, however other methods known in the art may also be suitable.

Figure 2B:
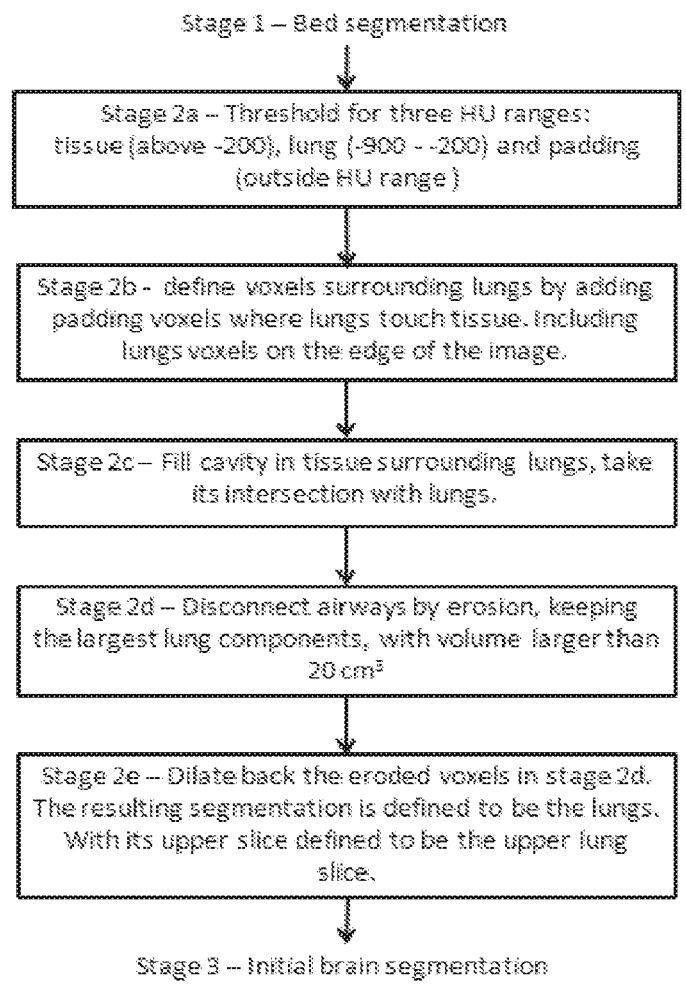
FIG. 2b is a flowchart of an exemplary, illustrative method for lung segmentation in a head-neck CT scan according to at least some embodiments of the present invention.

Reference is now made to FIG. 2b which is a flowchart of an exemplary, illustrative method for lung segmentation in head-neck CT scan according to at least some embodiments of the present invention. FIG. 2b describes Stage 2 of FIG. 2a in more detail. In Stage 2a three sub-images of the lower third of the scan are defined based on threshold Hounsfield values:
   a. Non-air tissue having a Hounsfield value above −200.
   b. Air/lungs having a Hounsfield value range of −900 to −200—"tissue b".
   c. Padding being out of the Hounsfield range—"tissue c". Padding blocks are added to an image in places where the HU in these places is not available, either because the reconstruction was not performed at this place, or was excluded by the technician.

In Stage 2b padding voxels which are up to 1 cm in distance from the initial lung segmentation (tissue b), and are connected to the lung segmentation through other padding voxels (tissue c), are selected.

In Stage 2c the padding blocks from Stage 2b are added to the non-air tissue identified in Stage 2a. Therefore in scans of a limited field of view around the lungs, where the surrounding tissue of the lungs is often not part of the image, this tissue will now be continued by the padding voxels. Filling the cavity in that tissue and taking its intersection with the lung tissue (Stage 2a) will segment the core of the lungs.

In Stage 2d the core of the lungs (result of segmentation of Stage 2c) is eroded with a 1.5 mm size structuring element in order to disconnect the airways from the lungs. Large lung components with volumes greater than 20 $cm^3$ are kept.

In Stage 2e the eroded voxels of Stage 2d are dilated back, with the same structure element, and the resulting segmentation is defined to be the lungs. The upper slice is defined to be the upper lung slice. The lung slice range is thus from the bottom of the data to the upper lung slice.

Figure 2C:
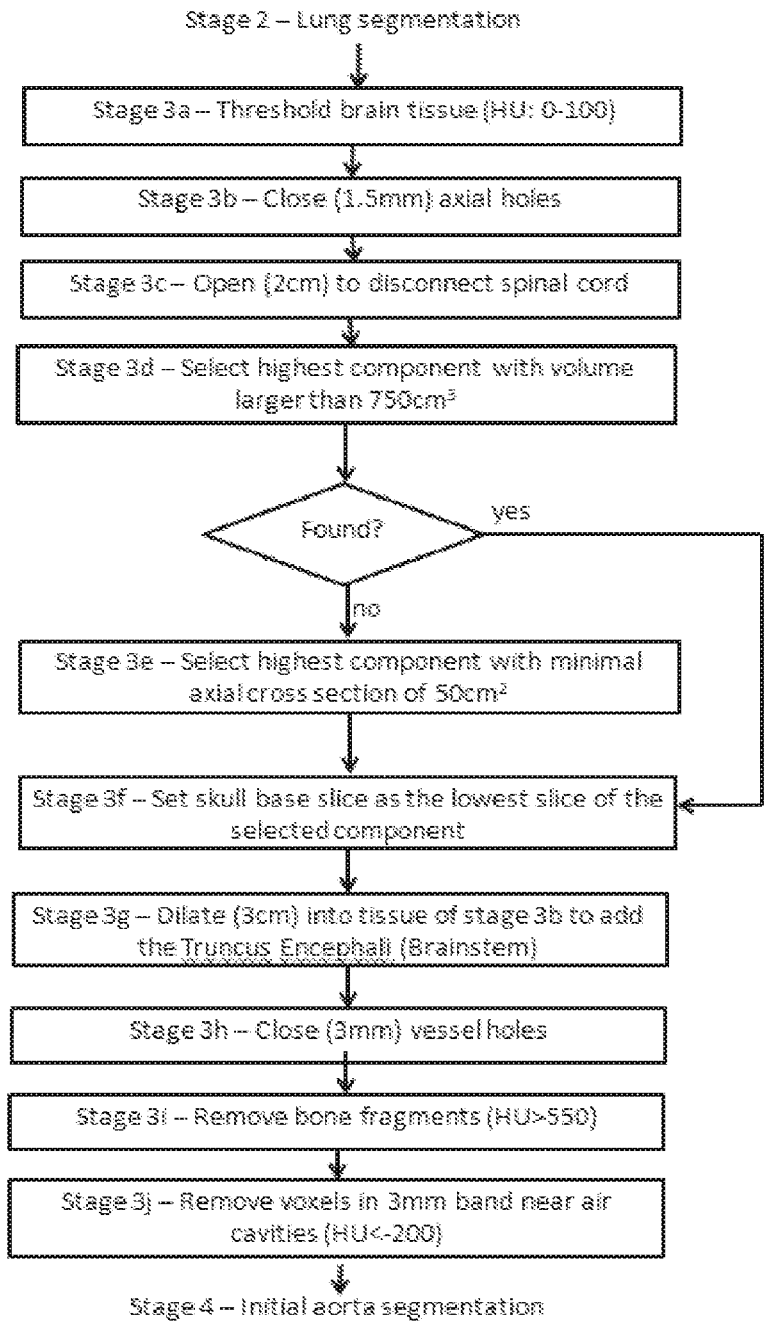
FIG. 2c is a flowchart of an exemplary, illustrative method for initial segmentation of the brain in a head-neck CT scan according to at least some embodiments of the present invention.

Reference is now made to FIG. 2c which is a flowchart of an exemplary, illustrative method for initial segmentation of the brain in a head-neck CT scan according to at least some embodiments of the present invention.

In Stage 3a brain tissue is identified by voxels having a threshold between the Hounsfield range of 0 to 100.

In Stage 3b small discontinuities in the brain tissue are closed by dilating and then eroding by a 1.5 mm size structure element.

In Stage 3c the spinal cord is disconnected by eroding using a 2 cm structure element and then dilating back using the same structure element.

In Stage 3d the top-most component with a volume larger than 750 $cm^3$ is selected. If no component is found, it is assumed that the scan ends above the forehead. In this case, at Stage 3e the highest component is chosen with a minimal axial cross section of 50 $cm^2$. If no such component exists, the algorithm terminates without results. In Stage 3f, the lowest slice in the selected component is regarded as the skull base slice and is used in later stages of the algorithm.

In Stage 3g the component segmented is dilated into the tissue segmented in Stage 3b using a 3 cm structure element, to add the Truncus Encephali (Brainstem). In Stage 3h small vessel holes are closed by dilating and then eroding with a 3 mm structure element.

In Stage 3i bone fragments inside the tissue are removed by selecting components with Hounsfield value above 550 and subtracting them from the tissue.

In Stage 3j voxels in a 3 mm band near air cavities are removed. These are selected based on an HU less than or equal to −200. The result is the brain segmentation, and its lowest slice is regarded as the brain base slice.

Figure 2D:
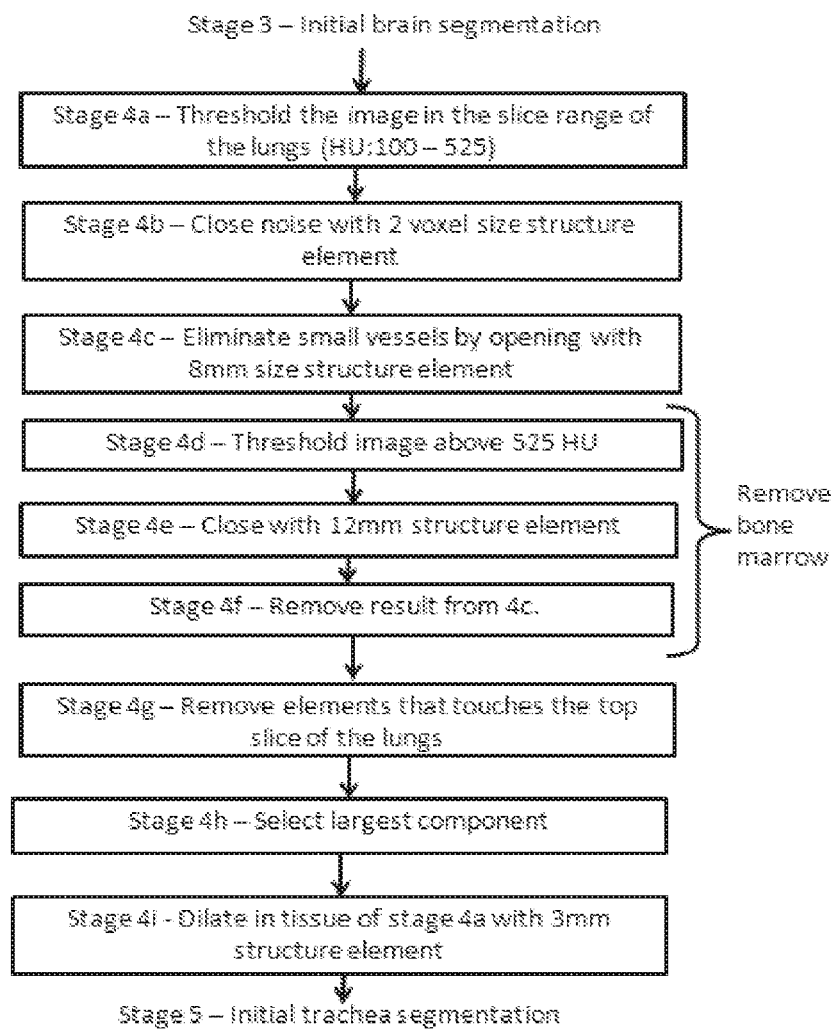
FIG. 2d is a flowchart of an exemplary, illustrative method for initial segmentation of the aorta in a head-neck CT scan according to at least some embodiments of the present invention.

Reference is now made to FIG. 2d which is a flowchart of an exemplary, illustrative method for initial segmentation of the aorta in a head-neck CT scan according to at least some embodiments of the present invention.

In Stage 4a the slice range identified as the lungs slice range as described above is thresholded between HU values of 100-525. In Stage 4b noise is removed by closing with a 2 voxel size structure element and in Stage 4c small vessels are eliminated by opening with an 8 mm size structure element. Contamination of the image with bone marrow voxels is corrected by identifying those voxels in Stages 4d-4f. In Stage 4d the entire image is thresholded for HU values above 525 to select bone marrow. In Stage 4e the selection of Stage 4d is closed with a 12 mm structure element and in Stage 4f the resulting voxels are removed from the segmentation obtained in Stage 4c. In Stage 4g components that touch the top slice of the lungs are removed. In Stage 4h the aorta is identified by selecting the largest component and in Stage 4i this component is dilated into the tissue of Stage 4a with a 3 mm structure element.

Figure 2E:
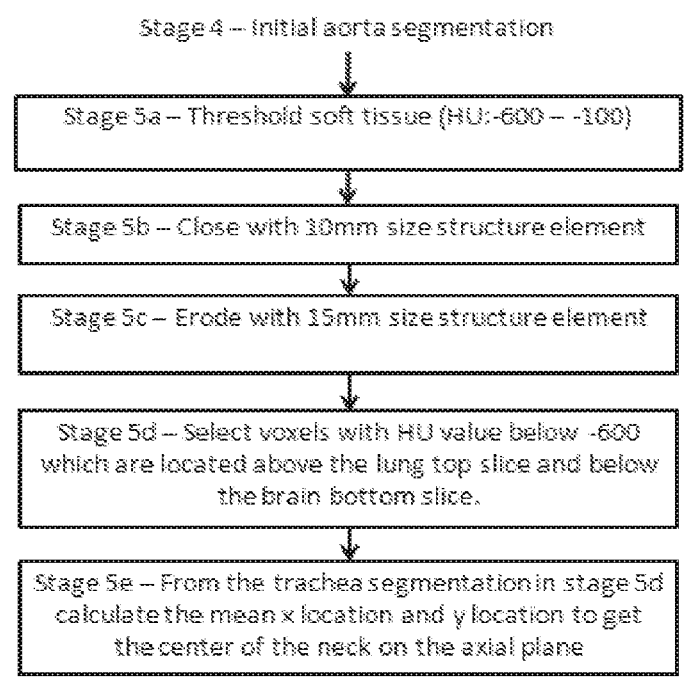
FIG. 2e is a flowchart of an exemplary, illustrative method for initial trachea segmentation in a head-neck CT scan according to at least some embodiments of the present invention.

Reference is now made to FIG. 2e which is a flowchart of an exemplary, illustrative method for initial trachea segmentation in a head-neck CT scan according to at least some embodiments of the present invention.

The segmentation of the trachea is started in Stage 5a by first thresholding soft tissue in an HU range of −600 to 100. In Stage 5b this is then closed with a 10 mm size structure element to include the trachea and in Stage 5c eroded with a 15 mm size structure element.

In Stage 5d the air in the previous segmentation is segmented by selecting all voxels with a Hounsfield value below −600 located in the slices between the upper lung slice and the brain base slice both identified above.

In Stage 5e, to find the center of the neck, an average of the x-axis and y values of the voxels in the trachea segmentation of Stage 5d is made. This average value is regarded as the middle of the neck, separating right from left.

Figure 3A:
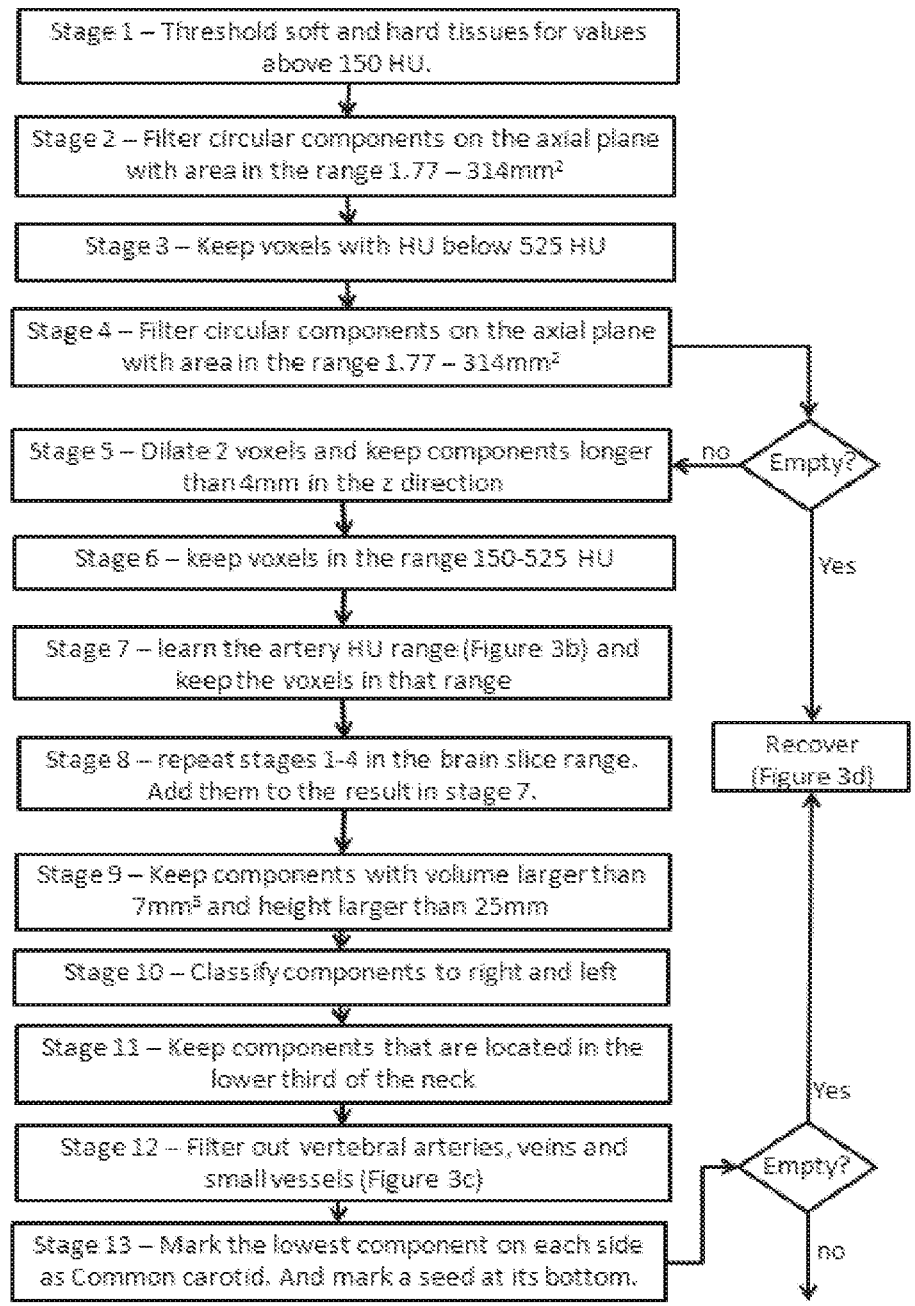
FIG. 3a is a flowchart of an exemplary, illustrative method for initial segmentation of the main neck arteries (the common, internal and external carotid arteries, and the vertebral arteries) in a head-neck CT scan according to at least some embodiments of the present invention.

Reference is now made to FIG. 3a which is a flowchart of an exemplary, illustrative method for initial segmentation of the Common Carotid arteries in a head-neck CT scan according to at least some embodiments of the present invention. An initial segmentation of the arteries in the neck is performed. The segmentation exploits the fact that the arteries have a circular cross section. While bone fragments might have a circular shape in some places for a narrow Hounsfield window range, the arteries have the circular shape both for a narrow and a wide Hounsfield range. The results provide candidate arteries from which the actual artery segmentations can be built without having to smooth the image or use atlas based methods.

In Stage 1 the image is thresholded for soft and hard tissues with HU values above 150. In Stage 2 circular components on the axial plane are selected in the slice range between the upper lung slice and the brain base slice. The circular shape is determined using the ratio of the 2d boundary component length squared, to the area. The ratio is allowed to deviate from 4n by 30% (regarded here as circle tolerance). All components are required to have an area larger than 1.77 mm$^2$ and smaller than 314 mm$^2$.

Out of the above components only voxels with Hounsfield value below 525 are selected in Stage 3, and then filtered again in Stage 4 for circles with circle tolerance of 30% and area in the range of 1.77 mm$^2$ to 314 mm$^2$ If the resulting segmentation is empty, the automatic procedure is stopped and the algorithm continues with a user aided recovery mode as described with reference to FIG. 3d, otherwise it continues to Stage 5.

In Stage 5 the circles are expanded by two voxels on the z-plane. Components with at least 5 mm length in the z-direction are the initial guess for the neck arteries. In these blood vessel components only voxels in the HU range of 150-525 are kept in Stage 6

In order to refine the segmentation, the Hounsfield range for the carotid arteries is determined from the initial segmentation in Stage 7. This Hounsfield range separates the veins from the arteries. It is assumed that, on average, the veins have lower Hounsfield values than the arteries, except the vein where the contrast agent is injected which has Hounsfield value above 525. Stage 7 is further described with reference to FIG. 3b below.

In Stage 8, Stages 1 to 4 of FIG. 3a are repeated for the brain slice range determined in the initial brain segmentation above. In Stage 9 candidates for the common carotid component are chosen by only considering components with a volume larger than 7 mm$^3$ which have a height (in the z direction) of more than 25 mm (to avoid confusion with the vertebral arteries, which are usually identified between the vertebrae, and therefore tend to have a height less than 2.5 cm).

In Stage 10 the retained blood vessel components are classified as right and left blood vessel components using the trachea segmentation that has been done before. These blood vessel components have to lie, at least partially, on the bottom third of the neck and therefore blood vessel components that are located in the lower third of the neck are kept in Stage 11. The neck is assumed to be, roughly, between the upper lung slice to the brain base slice.

In Stage 12 vertebral arteries, veins and small vessels are filtered out as further described below with reference to FIG. 3c. Finally in Stage 13 the lowest blood vessel component on each side is marked as the common carotid and a seed is marked on its bottom. If there are no components the algorithm recovers by prompting the user to manually identify the seeds inside the left and right common carotid arteries (FIG. 3d). After processing of these inputs, the automated process can continue with Stage 3 in FIG. 1.

Figure 3B:
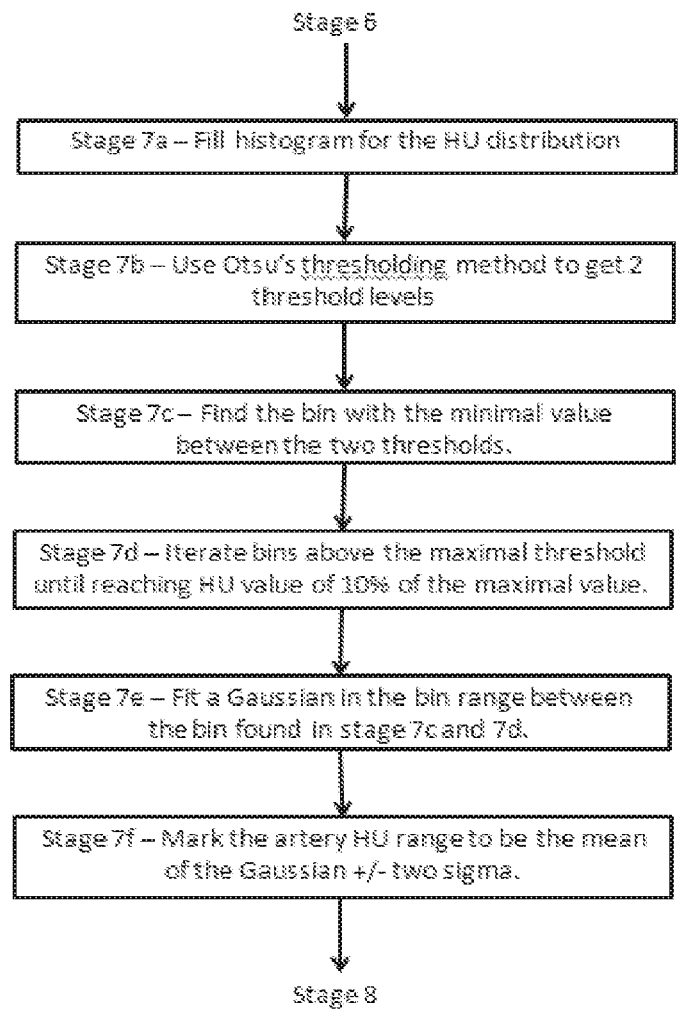
FIG. 3b is a flowchart of an exemplary, illustrative method for learning the artery HU range in a head-neck CT scan according to at least some embodiments of the present invention.

Reference is now made to FIG. 3b which is a flowchart of an exemplary, illustrative method for learning the artery HU range in a head-neck CT scan according to at least some embodiments of the present invention.

In Stage 7a, a histogram is filled with the Hounsfield value of the voxels belonging to the initial segmentation.

In Stages 7b and 7c, three Hounsfield values are determined. The values $v_1$ and $v_3$ are determined using the Otsu's two-level threshold method, as is known in the art in Stage 7b. The value $v_2$ is the Hounsfield value of the bin with the lowest weight in the range $[v_1, v_3]$ and is determined in Stage 7c.

The Hounsfield value interval $[v_2, v_3]$ is assumed to be controlled by the arteries, with little contamination from veins. However, this range is not exact and has to be refined. This is done in Stage 7d. In case there exists a local minimum in the histogram above $v_3$, it is assumed that this minimum indicates the interface between veins and arteries, and $v_2$ is relocated to that minima. In any case, $v_3$ is then relocated to the bin with the highest Hounsfield value above $v_2$ with a weight of at least 10% of the highest weight bin above $v_2$.

Since the Hounsfield distribution of the veins and the arteries may overlap, the interval $[v_2, v_3]$ is only a partial interval for the arteries' Hounsfield range. In Stage 7e the entire range is determined by fitting a Gaussian template to the histogram in the range $[v_2, v_3]$. In Stage 7f, the artery range is then defined to have its highest Hounsfield value at the mean of the Gaussian plus two standard deviations, and its minimum value at the mean of the Gaussian minus two standard deviations, but cannot be smaller than 150 Hounsfield units.

Figure 3C:
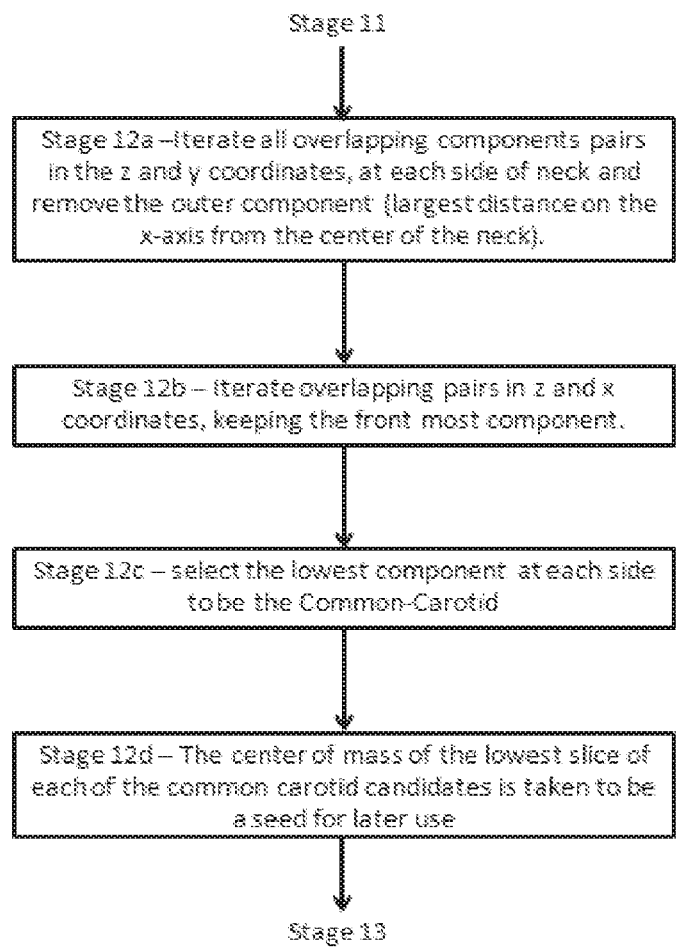
FIG. 3c is a flowchart of an exemplary, illustrative method for filtering out the vertebral arteries, veins and small vessels in a head-neck CT scan according to at least some embodiments of the present invention.

FIG. 3c is a flowchart of an exemplary, illustrative method for filtering out the vertebral arteries, veins and small vessels in a head-neck CT scan according to at least some embodiments of the present invention.

In Stage 12a the blood vessel components which are not central are disregarded. This is done by iterating over all pairs of blood vessel components, at each side separately. For each pair, in case the blood vessel components have more than 10% of their size overlap in height (z-axis) and in the forward-backward direction (y-axis) the more central in the right-left direction (closest to the trachea in the x-axis) is kept, while the other component is disregarded. This Stage is very efficient in rejecting veins since veins are usually external to the carotids in the neck.

In Stage 12b only forward blood vessel components are kept. This is done by iterating over all pairs of the blood vessel components remaining after Stage 12a. For each pair of blood vessel components that have an overlap of more than 10% in the z-direction the following aspects are checked: if at least half the length in the z-direction of one of the blood vessel components is both behind (in the y-direction) and has a cross-sectional area of less than half the size of the other blood vessel component then it is disregarded. This Stage is very efficient in rejecting the vertebral arteries since the vertebral arteries are generally thinner and tend to lie in the back of the neck.

In Stage 12c the common carotid component is regarded as the blood vessel component with the lowest slice on each side from the remaining blood vessel components in Stage 12b. In Stage 12d the center of mass of the lowest slice of each of the common carotid candidates is chosen as a seed for later use.

Figure 3D:
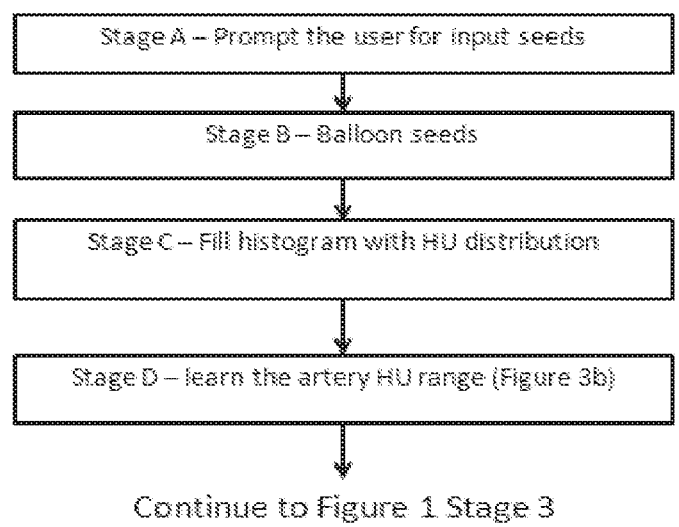
FIG. 3d is a flowchart of an exemplary, illustrative method for a user aided recovery process according to at least some embodiments of the present invention.

Reference is now made to FIG. 3d which is a flowchart of an exemplary, illustrative method for a user aided recovery process for the common carotid segmentation and seed selection. After the recovery process ends the automatic procedure continues in Stage 3 of FIG. 1. In Stage A the user is prompted to enter seeds in the common carotid. If no common carotids were found at all, the user is prompted for a seed input for both common carotids at a position of 2 cm above the lung slice. In case one common carotid was found, the user is prompted for a seed in the other common carotid at the same slice where the first common carotid seed was found.

In Stage B the input seeds are ballooned using a fast marching tool with a local cost of 1 in the HU range between 150-525 and exponential cost outside this range at the scale of 20:

$$\text{cost} = \begin{cases} \exp[-(150 - HU)/20], & HU < 150 \\ 1, & 150 < HU < 525 \\ \exp[-(HU - 525)/20], & HU > 525 \end{cases}$$

The balloon runs repeatedly for five iterations. The seeds for each iteration are the result of the previous iteration, and the stopping criteria is a path cost of 5.

In Stage C a histogram is filled with the HU distribution of the ballooned components.

In Stage D the carotid HU range is extracted from the histogram according to the procedure described in FIG. 3b. After this stage the automatic algorithm is recovered and continues as in FIG. 1 Stage 3.

Figure 4:
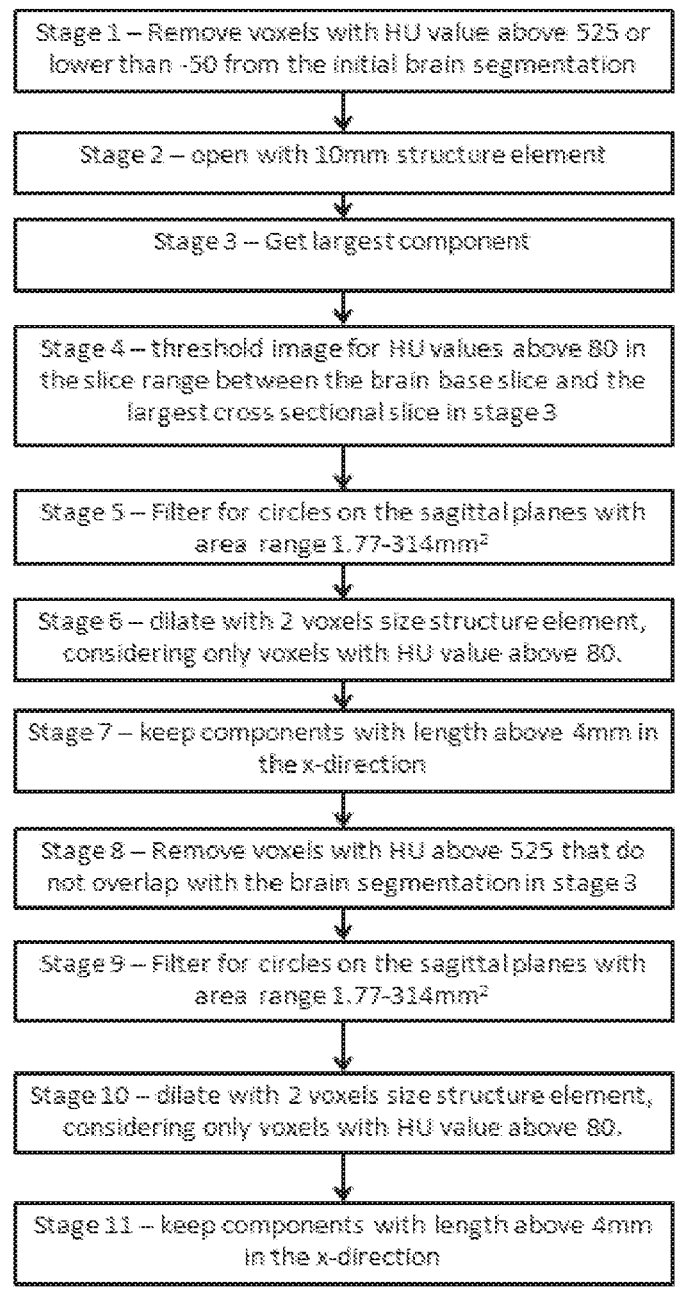
FIG. 4 is a flowchart of an exemplary, illustrative method for initial segmentation of brain arteries in a head-neck CT scan according to at least some embodiments of the present invention.

Reference is now made to FIG. 4 which is a flowchart of an exemplary, illustrative method for initial segmentation of brain arteries in a head-neck CT scan according to at least some embodiments of the present invention. In a later stage, a candidate seed will be selected from each of these components.

In Stage 1 all voxels above 525 Hounsfield or below −50 Hounsfield are removed from the initial brain segmentation.

In Stage 2 the remaining brain segmentation is opened using a 10 mm size structuring element to disassociate irrelevant parts from the main volume.

In Stage 3 only the largest component is retained as the brain segmentation and only voxels above the skull base slice are considered.

To segment the arteries in Stage 4, only voxels with Hounsfield range above 80 are selected in the slice range between the brain base slice and the largest cross sectional slice in Stage 3.

In Stage 5, only circle-like components on the sagittal plane are selected, with a circle tolerance of 30% and an area in the range 1.77 mm²-314 mm².

In Stage 6, dilation with a 2 voxel size structuring element is done, considering only voxels in the relevant Hounsfield value range above 80.

In Stage 7 only components that are at least 4 mm in size in the x-direction (left to right) are retained. These components are assumed to be fragments of the middle cerebral arteries (MCA) which typically lie in a left-right orientation with respect to the head. The MCA components are used as the ending seed points for the internal carotid segmentation.

In Stage 8 voxels with an HU above 525 that do not overlap with the brain segmentation in Stage 3 are removed.

In Stage 9 the large bone fragments are no longer circle-like and can be removed as follows: only circle-like components on the sagittal plane are filtered, with a circle tolerance of 30% and an area in the range 1.77 mm²-314 mm².

In Stage 10, these are dilated with a 2 voxel size structuring element, considering only voxels in the Hounsfield value range above 80.

In Stage 11 only artery components that are at least 4 mm in size on the x-direction (left to right) are retained.

Figure 5:
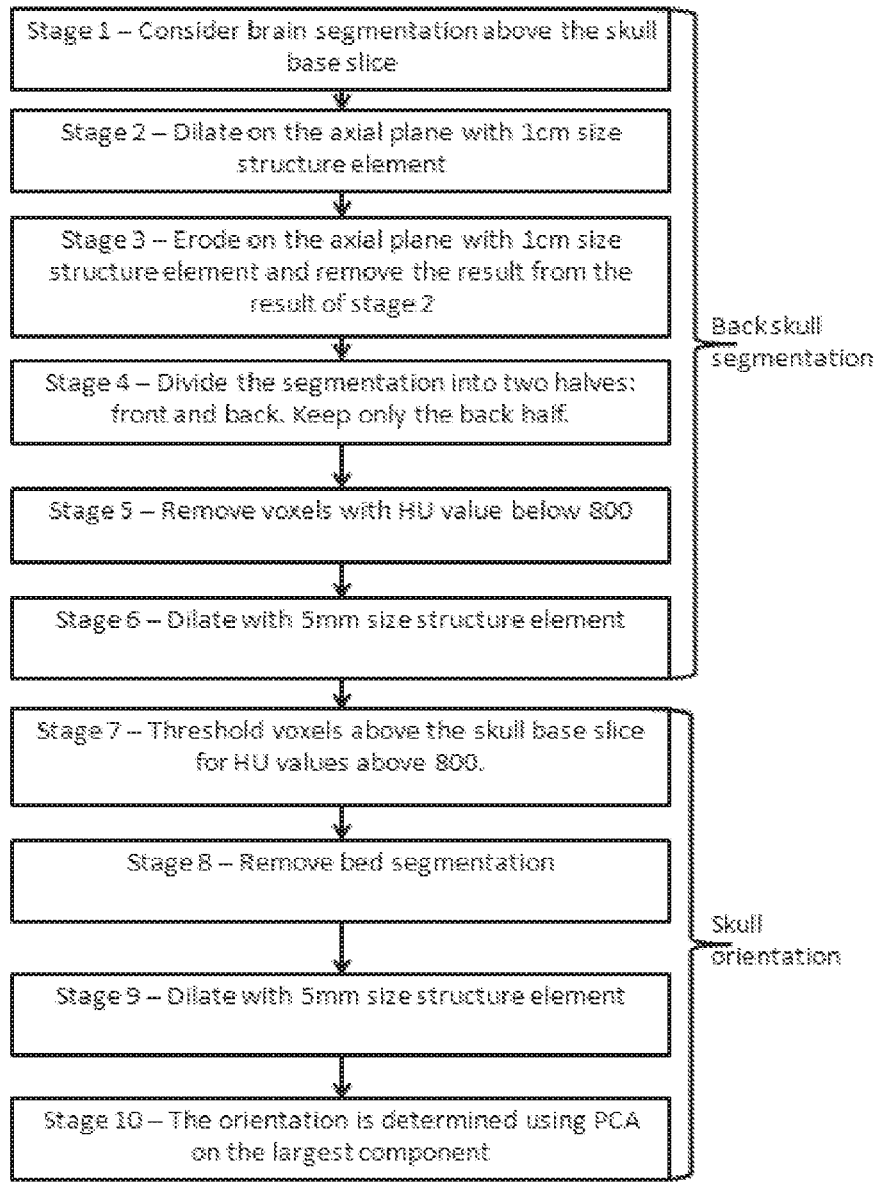
FIG. 5 is a flowchart of an exemplary, illustrative method for skull segmentation and determining skull orientation in a head-neck CT scan according to at least some embodiments of the present invention.

Reference is now made to FIG. 5 which is a flowchart of an exemplary, illustrative method for skull segmentation and determining skull orientation in a head-neck CT scan according to at least some embodiments of the present invention.

In Stages 1 to 6 the back skull is segmented. In Stage 1 only brain segmentation above the skull base slice is considered. The result is dilated on the axial plane with 1 cm size structure element in Stage 2. In Stage 3 this is eroded on the axial plane with 1 cm size structure element. The result of Stage 3 is removed from the result of Stage 2.

In Stage 4 the segmentation is divided into two halves: front and back—and only the back half is kept. In Stage 5 voxels with an HU value below 800 are removed and in Stage 6 the result is dilated with a 5 mm size structure element to complete the back skull segmentation. Since the arteries do not pass near the skull at the back of the head, it is assumed that the result is an artery free zone, and this will be used later to restrict the segmentation of the arteries and prevent them from leaking into the veins that do pass near the back of the skull.

In Stages 7 to 10, the skull orientation is determined. The skull orientation is required in addition to the trachea segmentation since the head of the patient may be rotated with respect to the center of the neck. Skull orientation is determined as follows.

In Stage 7 the image is filtered for Hounsfield values above 800 in the slices above the skull base slice. In Stage 8 the segmented bed that the patient is lying on is removed. In Stage 9, the result is dilated with a 5 mm size structure element. In Stage 10, since in most cases the head is not perfectly aligned with the modality axes, a primary component analysis (PCA) is used on the largest volume components to deduce the primary axis and the center of mass location.

The result of Stages 1-4 is an identification of blood vessel candidates in the neck, initial segmentation of the blood vessels in the head above the skull base slice and initial segmentation of the left and right common carotid arteries. The carotid arteries in the general area above the brain base slice and below the skull base slice are not detected. These areas are characterized by the carotids traversing adjacent to bones or having convoluted paths and a different Stage of the algorithm is required to segment the carotid arteries there.

Figure 6A:
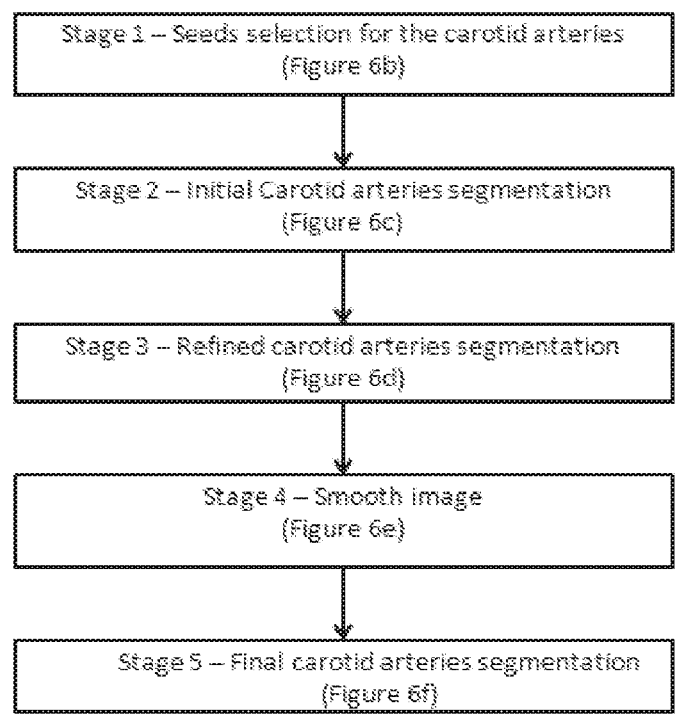
FIG. 6a is a flowchart of an exemplary, illustrative method for common-carotid and internal carotid arteries segmentation in a head-neck CT scan according to at least some embodiments of the present invention.

Reference is now made to FIG. 6a which is a flowchart of an exemplary, illustrative method for common-carotid and internal carotid arteries segmentation in a head-neck CT scan according to at least some embodiments of the present invention.

Figure 6B:
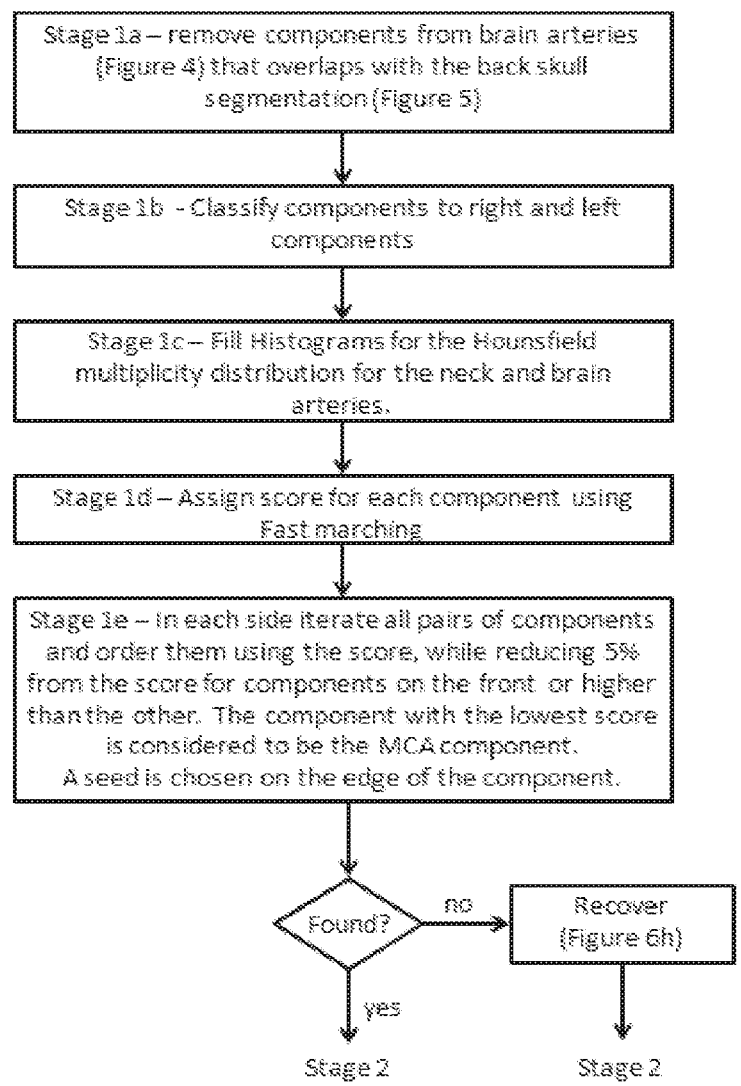
FIG. 6b is a flowchart of an exemplary, illustrative method for seeds selection for the carotid arteries in a head-neck CT scan according to at least some embodiments of the present invention.

In Stage 1 seeds are selected for the carotid arteries as further described below with reference to FIG. 6b. In Stage 2 the initial carotid arteries segmentation is performed as further described below with reference to FIG. 6c. In Stage 3 refined carotid arteries segmentation is performed as further described below with reference to FIG. 6d. In Stage 4 the image is smoothed as further described below with reference to FIG. 6e. In Stage 5 the final carotid arteries segmentation is performed as further described below with reference to FIG. 6f.

The stages shown in FIG. 3a and FIG. 4 result in choices of seeds that represent the most likely start and end points of the internal carotid arteries in the CT scan. For the internal carotid arteries segmentation there is a need to have two seeds for each vessel. One seed is located at the base of the common carotid artery, and the second seed is located at the end of the internal carotid artery in the brain. The starting seeds in the common carotid arteries are the lowest voxels in each of the initial common carotid artery segmentations derived previously (Stage 6 of FIG. 3a).

The ending seed is deduced by iterating through vessel candidates in the brain (which are potential candidates for the end of the internal carotid arteries and were segmented in FIG. 4) and finding the best candidate to serve as a seed. This procedure is done in several steps which will be further described below:
 1) Fix a seed for each candidate blood vessel segment in the brain
 2) Associate a score with each seed as a potential part of the internal carotid
 3) Refine the score using anatomical knowledge Reference is now made to FIG. 6b which is a flowchart of an exemplary, illustrative method for seeds selection for the carotid arteries in a head-neck CT scan according to at least some embodiments of the present invention.

Stage 1a starts with a list of potential blood vessel components from the brain arteries, as described above with reference to FIG. 4. From this list, components that overlap with the back skull segmentation as described above with reference to FIG. 5 are removed. In Stage 1b the components are classified into right and left components. Right components are all components whose voxels all fall between 1 cm to the left of the neck center and the right of the image. Left components are all components whose voxels all fall between 1 cm to the right of the next center and the left of the image. By the above definition, a component can be considered both a left and right component.

In Stage 1c two histograms are filled for the HU multiplicity distribution for the neck and brain arteries. The brain arteries histogram is filled by dilating the brain arteries segmentation (with reference to FIG. 4) using a 2 mm structure element. The neck arteries histogram is filled using the neck arteries segmentation as described with reference to FIG. 3a.

In Stage 1d a score is assigned to each blood vessel component by using the Fast marching algorithm such as described in U.S. Pat. No. 8,352,174 the entire disclosure of which is hereby incorporated by reference and for all purposes in its entirety as if fully set forth herein. The score of each component is the fast-marching path cost distance normalized by the Euclidean distance needed to go from a seed in the neck (with reference to FIG. 3a) to the seed in the component using the two histograms to construct local costs. The neck histogram is used to construct the cost below the brain slice, and the brain histogram is used to construct the cost above the brain slice. The local cost is defined by taking the inverse weight of the histogram and modifying it in order to take into account prior information. An algorithm to calculate the local cost for a voxel is given as:
 a. The local cost is initially assigned the inverse weight of that voxel in the histogram to which it belongs (brain arteries histogram or neck arteries histogram). That is, the bin to which the voxel contributes is taken according to its HU value and the cost is the inverse bin count of that bin.
 b. If the voxel is located in the initial segmentation (FIG. 3a Stage 13) of the common carotid its local cost is multiplied by 0.1
 c. If the voxel is located inside the artery-free zone (FIG. 5 Stages 1-6) its weight is multiplied by 10.
 d. If the voxel falls inside the general artery-like segmentation (FIG. 3a Stage 4), its weight is multiplied by 0.8.
 e. If the fast marching is initialized with the seed of the right common carotid, and the voxel falls on the left side of the primary axis (FIG. 5 Stage 10) it is multiplied by $1+0.16d^2$, where d is the distance in mm of the voxel from the primary axis. For a march initialized with the left common carotid seed the mirror condition is applied.

In Stage 1e—Separately for each side iterate all pairs of blood vessel components and order them using the score. Then reduce 5% from the score of the component that is in front or above the other for each of the pairs. The component with the lowest score is considered to be the MCA component. A seed is chosen on the far end of the component. If no blood vessel component is found a user aided recovery procedure is initiated and the process continues to FIG. 6h.

Figure 6C:
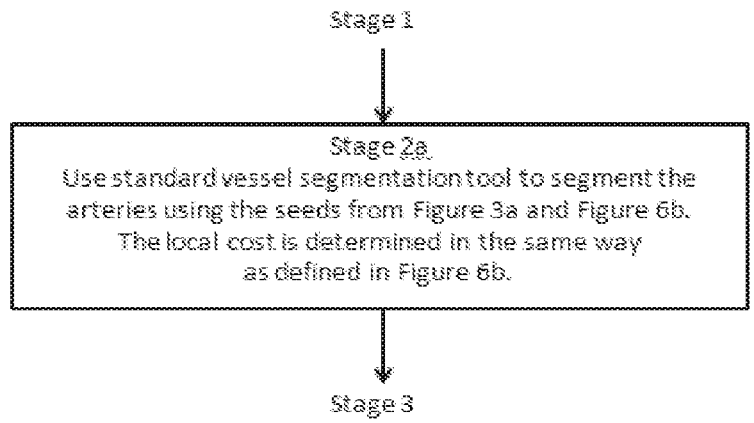
FIG. 6c is a flowchart of an exemplary, illustrative method for initial carotid arteries segmentation in a head-neck CT scan according to at least some embodiments of the present invention.

Reference is now made to FIG. 6c which is a flowchart of an exemplary, illustrative method for initial carotid arteries segmentation in a head-neck CT scan according to at least some embodiments of the present invention. In Stage 2a a standard vessel segmentation tool is used to segment the arteries using the seeds as derived with reference to FIGS. 3a and 6b. The local cost is determined in the same way as defined with reference to FIG. 6b.

Figure 6D:
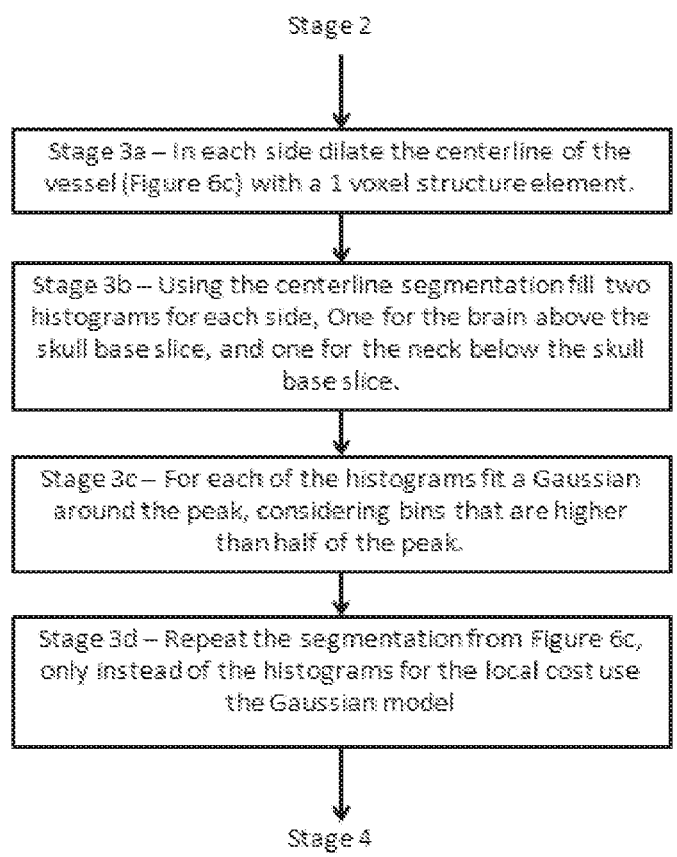
FIG. 6d is a flowchart of an exemplary, illustrative method for refined carotid arteries segmentation in a head-neck CT scan according to at least some embodiments of the present invention.

Reference is now made to FIG. 6d which is a flowchart of an exemplary, illustrative method for refined carotid arteries segmentation in a head-neck CT scan according to at least some embodiments of the present invention. In Stage 3a the centerline of the vessel on each side, as derived with reference to FIG. 6c, is dilated with a 1 voxel structure element. In Stage 3b the centerline segmentation is used to fill two histograms for each side. One for the brain above the skull base slice, and one for the neck below the skull base slice.

In Stage 3c, for each of the histograms fit a Gaussian distribution around the maximal height, considering only bins that are higher than half of the maximum height. In Stage 3d the segmentation as performed with reference to FIG. 6c is repeated with the same seeds but the Gaussian model is used for the local cost instead of the histograms so that the initial cost in step a of the above algorithm is the inverse of the histogram.

Figure 6E:
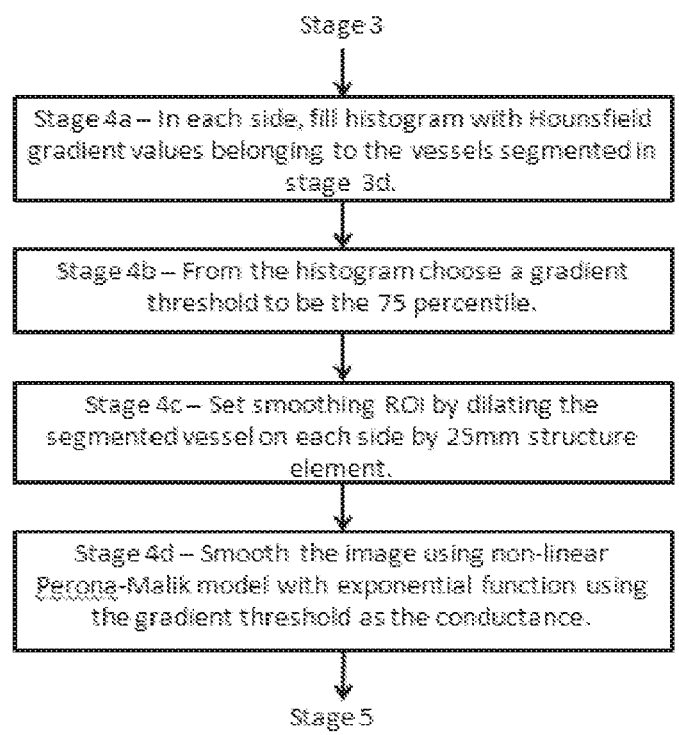
FIG. 6e is a flowchart of an exemplary, illustrative method for image smoothing in a head-neck CT scan according to at least some embodiments of the present invention.

Reference is now made to FIG. 6e which is a flowchart of an exemplary, illustrative method for image smoothing in a head-neck CT scan according to at least some embodiments of the present invention. In Stage 4a for each side, a histogram is filled with HU gradient magnitude values belonging to the vessels segmented in Stage 3d. The gradient is calculated using a Gaussian filter with a scale of 1 mm. In Stage 4b a gradient threshold is chosen from the histogram to be the $75^{th}$ percentile. In Stage 4c the smoothing ROI is set by dilating the right and left segmented vessels with a 25 mm structure element. The ROI is constructed in order to speed up the smoothing process, since there is no need to smooth the image far away from the initial segmentation of the vessel. In Stage 4d the image is smoothed using a non-linear Perona-Malik model with an exponential function using the gradient threshold as the conductance.

Figure 6F:
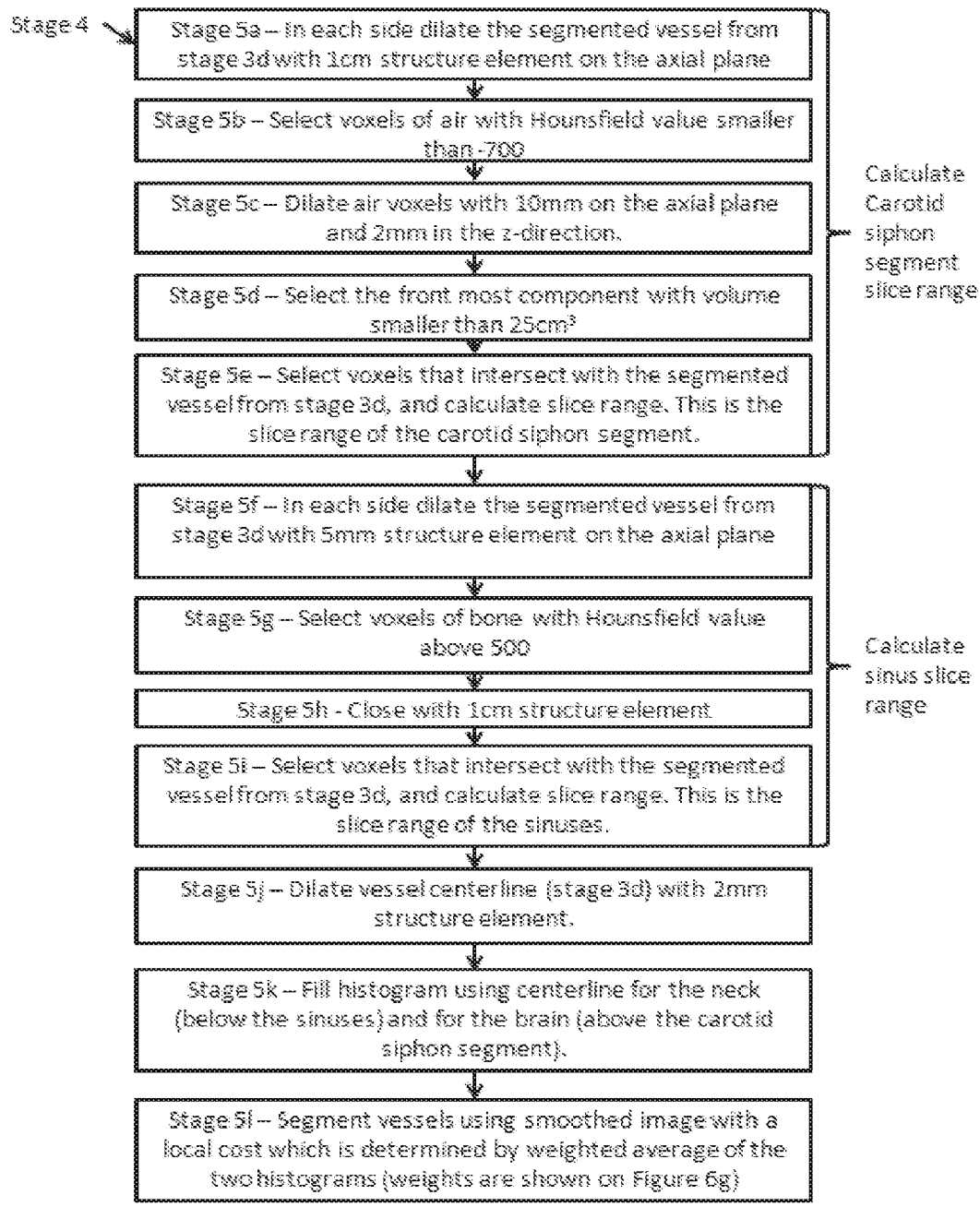
FIG. 6f is a flowchart of an exemplary, illustrative method for final carotid arteries segmentation in a head-neck CT scan according to at least some embodiments of the present invention.

Reference is now made to FIG. 6f which is a flowchart of an exemplary, illustrative method for final carotid arteries segmentation in a head-neck CT scan according to at least some embodiments of the present invention. Stages 5a-5e result in the calculation of the carotid siphon segment slice range. In Stage 5a, for the left and right carotid segmentations separately, the segmented vessel from Stage 3d of FIG. 6d is dilated with a 1 cm structure element on the axial plane. In Stage 5b voxels of air with HU values smaller than −700 are selected. In Stage 5c air components with 10 mm on the axial plane and 2 mm in the z-direction are dilated. In Stage 5d the front most component with volume smaller than 25 cm³ is selected. In Stage 5e voxels that intersect with the segmented vessel from Stage 3d are selected and the slice range is calculated. This is the slice range of the carotid siphon segment.

Stages 5f-5i result in the calculation of the sinus slice range. In Stage 5f, for the left and right carotid segmentations from Stage 3d separately, each segmentation is dilated with a 5 mm structure element on the axial plane. In Stage 5g voxels of bone with an HU value above 500 are selected. In Stage 5h the result is closed with a 1 cm structure element. In Stage 5i voxels that intersect with the segmented vessel from Stage 3d are selected and the slice range is calculated. This is the slice range of the sinuses.

Figure 6G:
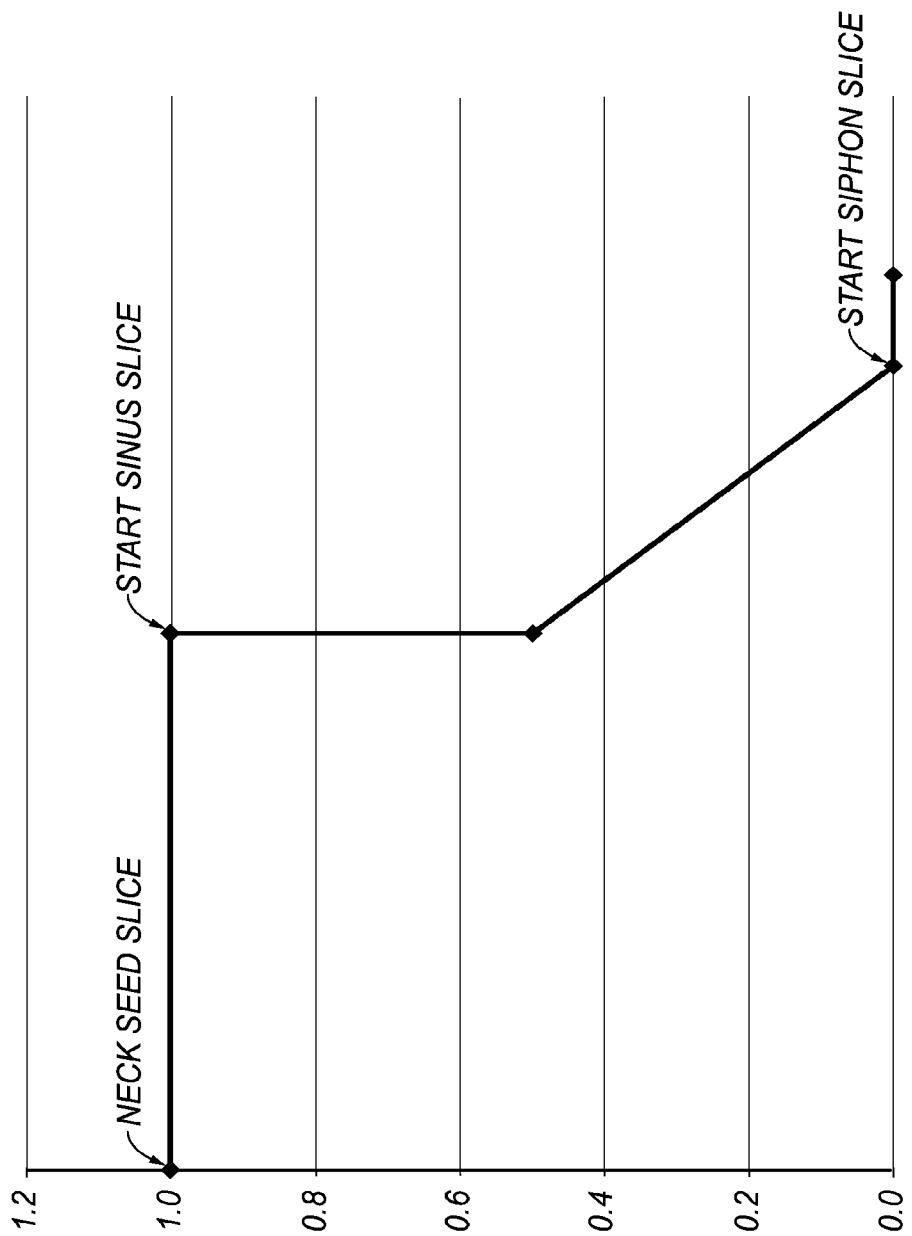
FIG. 6g is a chart of an exemplary slice weight as a function of the slice location to be used in the voxel cost function in a head-neck CT scan according to at least some embodiments of the present invention.

In Stage 5j, for the left and right segmented carotid arteries from Stage 3d the vessel centerline is dilated with a 2 mm structure element. In Stage 5k a histogram is filled using the dilated centerline for the neck (below the sinuses) and for the brain (above the carotid siphon segment). In Stage 5l the left and right carotid arteries are segmented again using the smoothed image with a local cost which is determined by the weighted average of the two histograms where the weights are a function of the slice (FIG. 6g). Having two histogram $h_1$ and $h_2$ and a weight w, the weighted average is.

$$wh_1 + (1-w)h_2$$

The weight function w is interpolated between slices as follow (s is the slice number, $s_s$ is the slice number where the sinus begins, $s_p$ is the slice number where the siphon begins):

$$w(s) = \begin{cases} 1, & s < s_s \\ \dfrac{s_p - s}{2(s_p - s_s)}, & s_s \leq s < s_p \\ 0, & s > s_p \end{cases}$$

The seeds used are the same seeds that were used previously to segment these vessels.

Reference is now made to FIG. 6g which is a chart of an exemplary illustrative method for interpolated histogram vs. slice location of a voxel in a head-neck CT scan according to at least some embodiments of the present invention. The graph shows the weights as a function of the slices that are being used in the averaging which are calculated in Stage 5l.

Figure 6H:
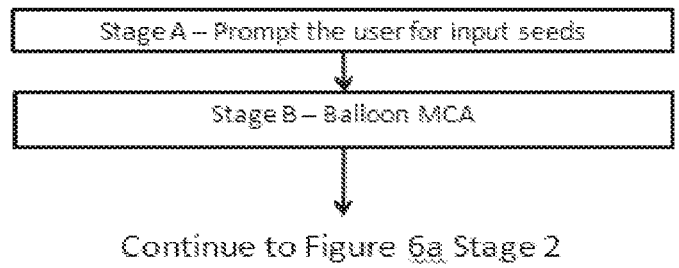
FIG. 6h is a flowchart of an exemplary, illustrative method for a user aided recovery process according to at least some embodiments of the present invention.

Reference is now made to FIG. 6h which is a chart of an exemplary illustrative method for user aided recovery for the MCA segmentation and seed selection.

In Stage A the user is prompted for a seed in the MCA. In case both MCAs are missing the user is prompted for seeds in the slice of 1.5 cm below the slice with the largest cross section in the brain segmentation. In cases where one of the MCAs was found the user is prompted for a seed in the same slice as where the other MCA was found.

In Stage B the input seeds are ballooned using a fast marching tool with a local cost of 1 in the HU range of 100-525 and a cost that grows exponentially outside this rage with a scale of 20:

$$\text{cost} = \begin{cases} \exp[-(100 - HU)/20], & HU < 100 \\ 1, & 100 < HU < 525 \\ \exp[-(HU - 525)/20], & HU > 525 \end{cases}$$

The balloon is done in 5 iterations, where the input seeds for each iteration are the output segmentation of the previous iteration, and the stopping criteria is a path cost of 2. After this stage the automatic procedure is recovered and the algorithm continues in FIG. 6a Stage 2.

Figure 7A:
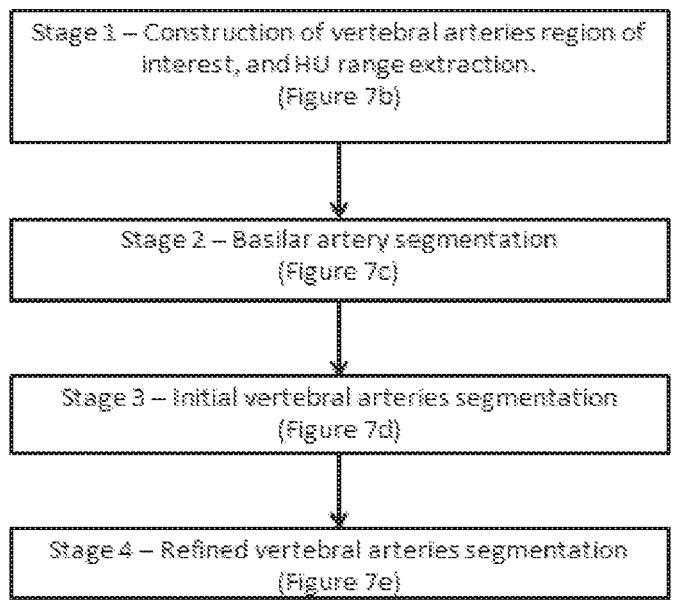
FIG. 7a is a flowchart of an exemplary, illustrative method for vertebral arteries segmentation in a head-neck CT scan according to at least some embodiments of the present invention.

Reference is now made to FIG. 7a which is a flowchart of an exemplary, illustrative method for vertebral arteries segmentation in a head-neck CT scan according to at least some embodiments of the present invention.

In Stage 1 the region of interest of the vertebral arteries is constructed and the HU range is extracted. Stage 1 is further described with reference to FIG. 7b. In Stage 2 a seed for the basilar artery is found. Stage 2 is further described with reference to FIG. 7c. In Stage 3 the initial vertebral arteries segmentation is performed. Stage 3 is further described with reference to FIG. 7d. In Stage 4 the refined vertebral arteries segmentation is performed. Stage 4 is further described with reference to FIG. 7e.

Figure 7B:
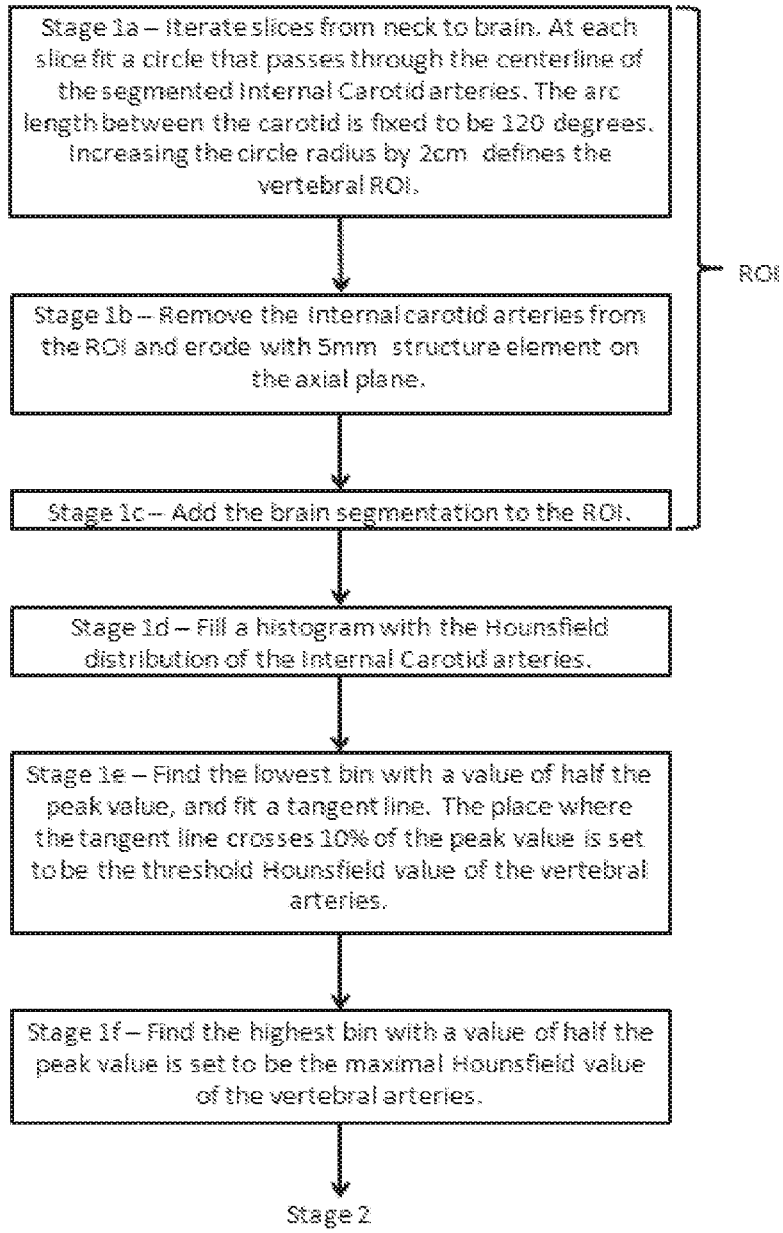
FIG. 7b is a flowchart of an exemplary, illustrative method for construction of vertebral arteries region of interest, and HU range extraction in a head-neck CT scan according to at least some embodiments of the present invention.

Reference is now made to FIG. 7b which is a flowchart of an exemplary, illustrative method for construction of vertebral arteries region of interest (ROI), and HU range extraction in a head-neck CT scan according to at least some embodiments of the present invention.

Stages 1a-1c define the ROI. Stage 1a iterates through slices from the neck to the brain as defined above. At each slice a circle is fitted that passes through the centerline of the segmented internal carotid arteries. The arc length between the carotid is fixed to be 120 degrees. The ambiguity for the side of the center is reduced by choosing the center to be on the back side of the image. Increasing the circle radius by 2 cm, to take into account twists along the carotid paths, defines the vertebral ROI as the set of all such circles. The ROI will be used later on to speed up the process of circle finding, since the vertebral arteries pass inside the ROI, and there is no need to look for them elsewhere. In Stage 1b the internal carotid arteries are removed from the ROI and the result is eroded with a 5 mm structure element on the axial plane to exclude some of the vertebral bones and spinal cord. In Stage 1c the brain segmentation derived above is added to the ROI.

In Stage 1d a histogram is filled with the HU distribution of the internal carotid arteries. In Stage 1e the lowest bin with a value closest to half of the peak value is found and a tangent line is fitted to the histogram at that bin value. The place where the tangent line crosses 10% of the peak value is set to be the low threshold HU value of the vertebral arteries. In Stage 1f the highest bin with a value closest to half of the peak value is set to be the high threshold HU value of the vertebral arteries.

Figure 7C:
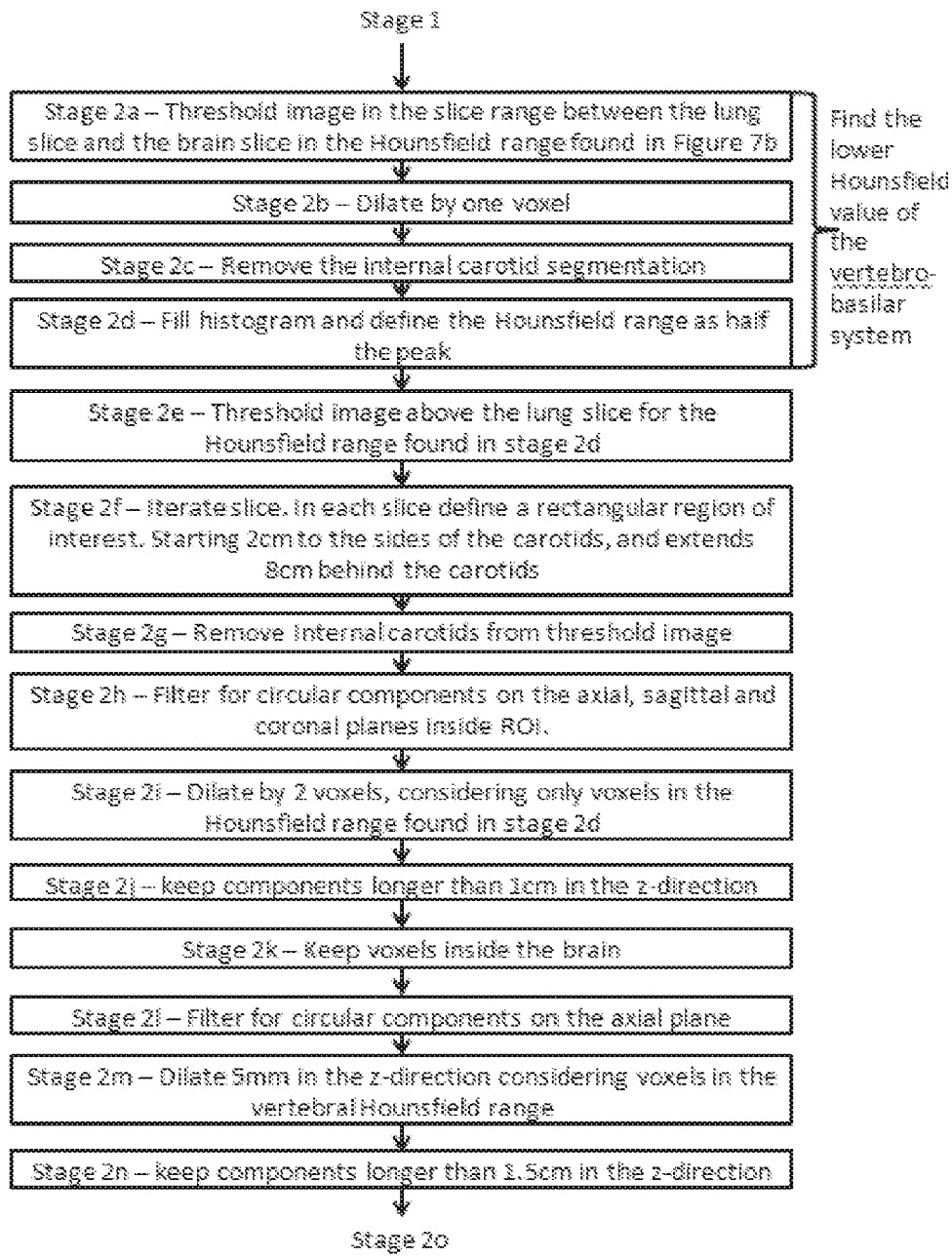
FIG. 7c is a flowchart of an exemplary, illustrative method for basilar artery segmentation in a head-neck CT scan, according to at least some embodiments of the present invention.
Figure 7C:
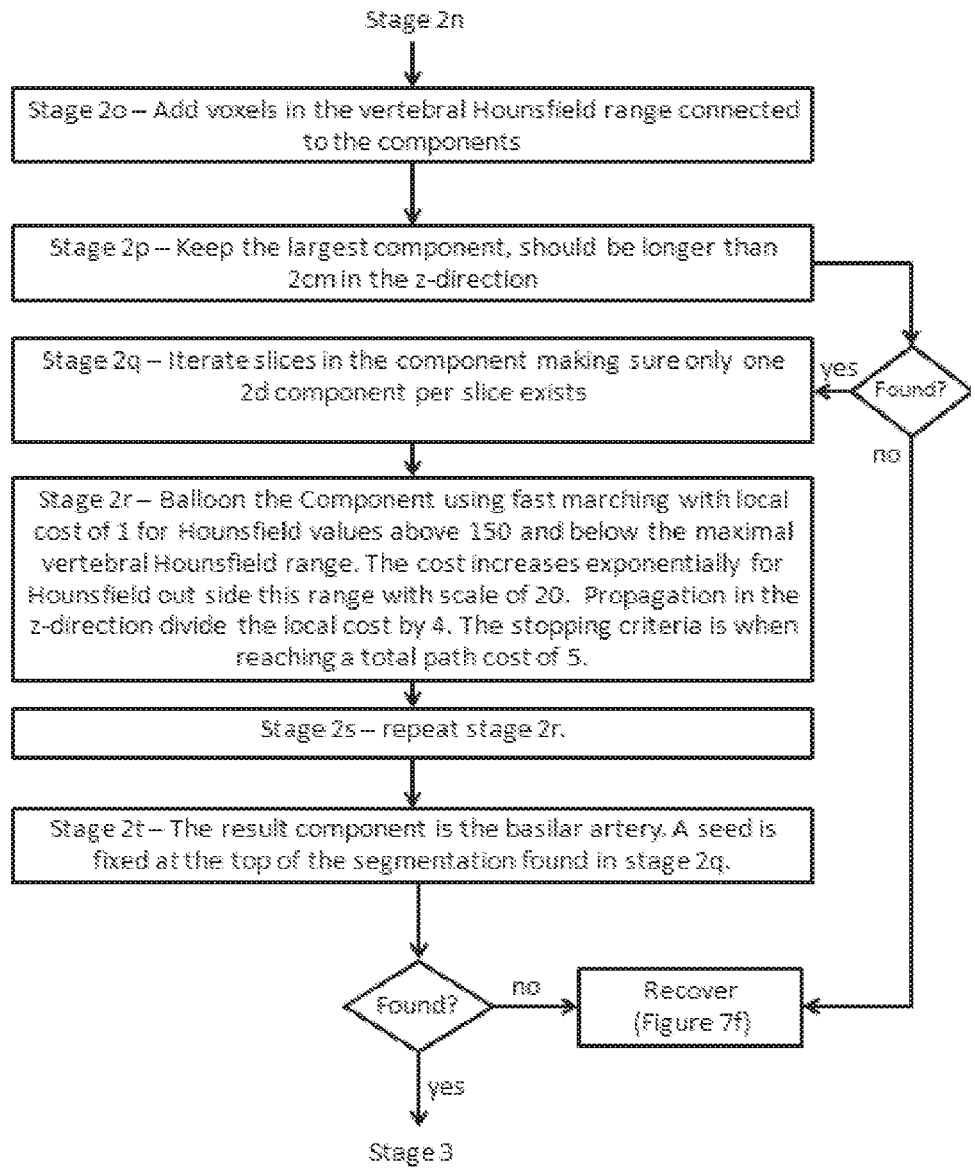

Reference is now made to FIG. 7c which is a flowchart of an exemplary, illustrative method for basilar artery segmentation in a head-neck CT scan, according to at least some embodiments of the present invention.

Stages 2a-2d aim to derive the lower Hounsfield value of the Hounsfield range of the vertebro-basilar system. In Stage 2a the image is thresholded in the slice range between the lung slice and the brain slice in the HU range found as described above with reference to FIG. 7b. In Stage 2b the result is dilated by one voxel. In Stage 2c the internal carotid segmentation is removed. In Stage 2d a histogram is filled and the HU range is defined as the range having values larger than half the peak around the peak.

In Stage 2e the image is thresholded above the lung slice for the HU range found in Stage 2d. In Stage 2f, for each slice a rectangular region of interest is defined starting 2 cm to the sides of the carotids, and extending 8 cm behind the carotids. In Stage 2g the internal carotids are removed from the thresholded image. In Stage 2h a filter is applied at the intersection of the results of the previous stage and the ROI defined in FIG. 7b, keeping only voxels in circles on the axial, sagittal and coronal planes with a cross sectional area in the range of 1.77-314 mm$^2$ and tolerance of 30%. In Stage 2i the result is dilated by 2 voxels, considering only voxels in the Hounsfield range found in Stage 2d.

In Stage 2j components shorter than 1 cm in the z-direction are removed. In Stage 2k voxels outside the brain are removed. In Stage 2l a filter is applied keeping only voxels in circles on the axial plane with a cross sectional area in the range of 1.77-314 mm$^2$ and tolerance of 30%. In Stage 2m the result is dilated 5 mm in the z-direction considering voxels in the vertebral Hounsfield range (Stage 2d). In Stage 2n components longer than 1.5 cm in the z-direction are kept. In Stage 2o voxels in the vertebral HU range connected to the components found in Stage 2n are added.

In Stage 2p the largest component is kept. This should be longer than 2 cm in the z-direction. If no component is found a user aided recovery procedure is enabled and the process continues to FIG. 7f.

In Stage 2q the algorithm runs through the slices from bottom to top and top to bottom in the component. For each slice only one 2d component is kept. Optionally, the 2d component which has the maximal overlap with the 2d component in the previous slice is used. Optionally, the 2d component whose center of mass is closest to the center of mass of the previous slice is used. Both options provide similar results but the second is more time efficient.

In Stage 2r the resulting blood vessel component is ballooned using fast marching with local cost of 1 for HU values above 150 and below the maximal vertebral Hounsfield range. The cost is raised exponentially for HU values outside this range with a scale of 20, as in the formula below ($H_{up}$ is the upper Hounsfield value).

$$\text{cost} = \begin{cases} \exp[-(150 - HU)/20], & HU < 150 \\ 1, & 150 < HU < H_{up} \\ \exp[-(HU - H_{up})/20], & HU > H_{up} \end{cases}$$

Propagation in the z-direction divides the local cost by 4. The stopping criteria is defined as a total path cost of 5.

In Stage 2s, Stage 2r is repeated. In Stage 2t the resulting component is the basilar artery. A seed is fixed at the top of the segmentation found in Stage 2q. If no blood vessel component is found a user aided recovery procedure is enabled and the process continues to FIG. 7f.

Figure 7D:
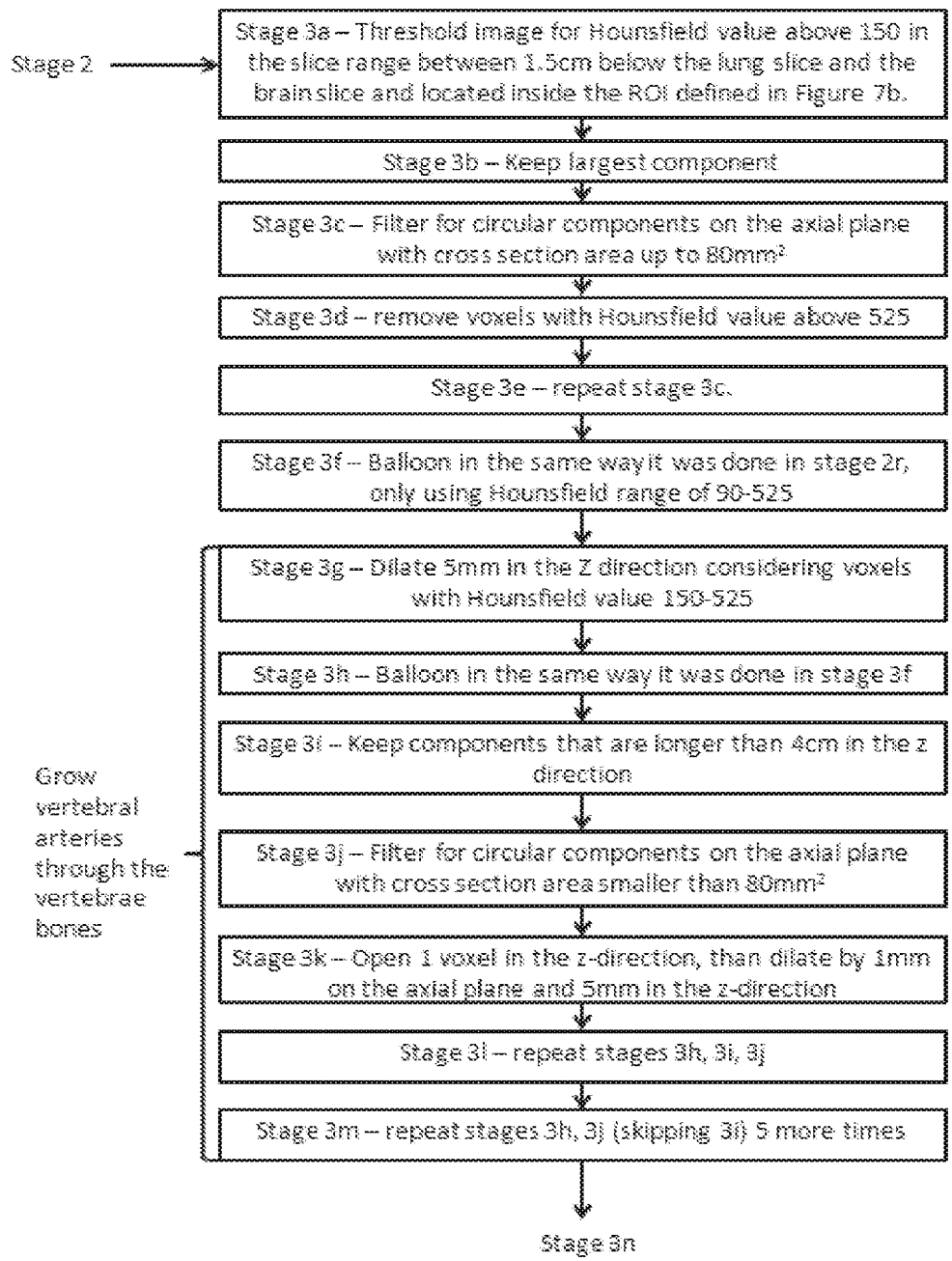
FIG. 7d is a flowchart of an exemplary, illustrative method for initial segmentation of the vertebral arteries, in a head-neck CT scan according to at least some embodiments of the present invention.
Figure 7D:
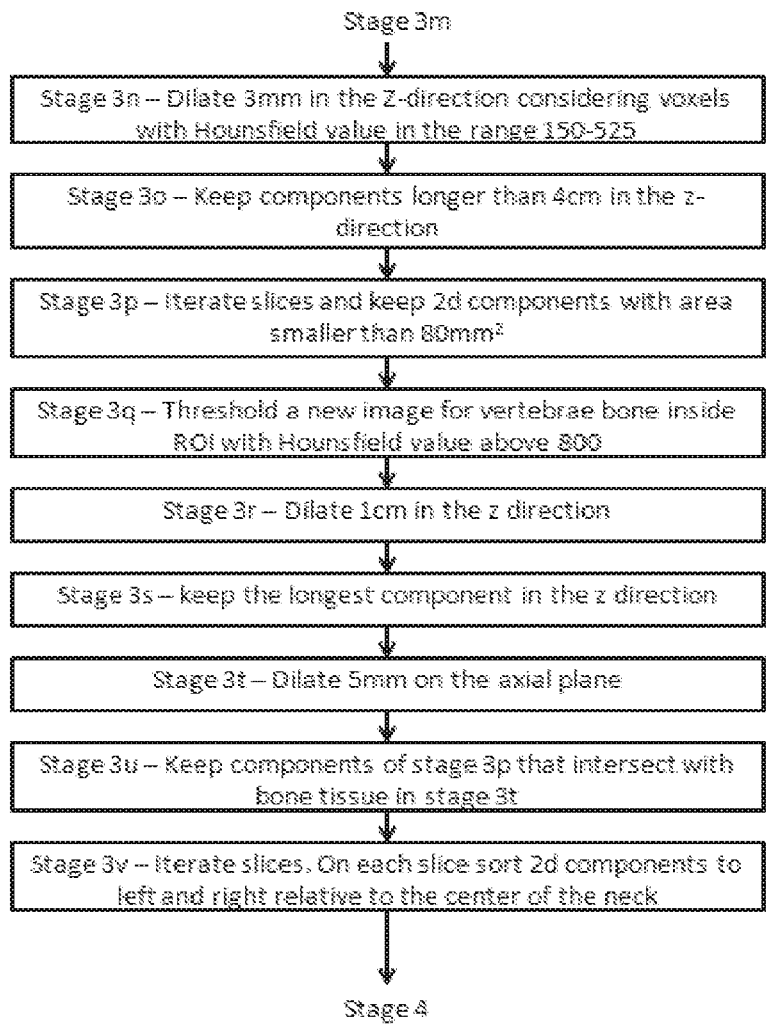

Reference is now made to FIG. 7d which is a flowchart of an exemplary, illustrative method for initial segmentation of the vertebral arteries, in a head-neck CT scan according to at least some embodiments of the present invention.

In Stage 3a the image is thresholded for HU values above 150 in the slice range between 1.5 cm below the lung slice and the brain slice and located inside the ROI defined with reference to FIG. 7b. In Stage 3b the largest component is kept. In Stage 3c a filter is applied for circles on the axial plane with a cross sectional area up to 80 mm$^2$ and tolerance of 30%. In Stage 3d voxels with an HU value above 525 are removed. In Stage 3e, Stage 3c is repeated and only those circles are kept. In Stage 3f the result is ballooned in the same way as in Stage 2r of FIG. 7c but using an HU range of 90-525.

In Stages 3g-3m the vertebral arteries are grown through the vertebral bones. In Stage 3g the input segmentation from Stage 3f is dilated 5 mm in the z direction considering voxels with HU values from 150-525. In Stage 3h the result is ballooned in the same way as done in Stage 3f. In Stage 3i blood vessel components that are longer than 4 cm in the z direction are kept. In Stage 3j a filter is applied for circles on the axial plane with a cross sectional area smaller than 80 mm$^2$ and 30% tolerance. In Stage 3k the image is opened once in the z-direction, and then dilated by 1 mm on the axial plane and 5 mm in the z-direction.

In Stage 3l, Stages 3h, 3i, and 3j are repeated. In Stage 3m, Stages 3h and 3j are repeated (while skipping Stage 3i) 5 more times. In Stage 3n, the result is dilated 3 mm in the z-direction considering voxels with an HU value in the range 150-525. In Stage 3o, components longer than 4 cm in the z-direction are kept. Stage 3p involves iterating through the slices and keeping 2d components with an area smaller than 80 mm$^2$.

In Stage 3q, a new image is thresholded for vertebrae bones inside the ROI with HU values above 800. In Stage 3r, the result is dilated 1 cm in the z direction. In Stage 3s, the longest component in the z direction is kept. In Stage 3t the result is dilated 5 mm on the axial plane. In Stage 3u, only the components of Stage 3p that intersect with bone tissue in Stage 3t are kept. In Stage 3v, on each slice 2d components are classified between left and right relative to the center of the neck.

Figure 7E:
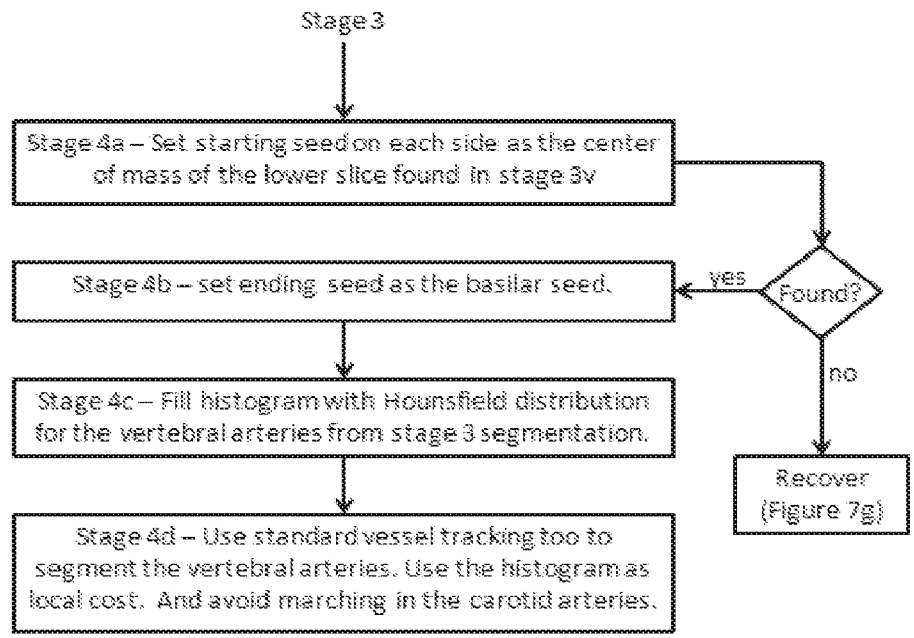
FIG. 7e is a flowchart of an exemplary, illustrative method for refined segmentation of the vertebral arteries, in a head-neck CT scan according to at least some embodiments of the present invention.

Reference is now made to FIG. 7e which is a flowchart of an exemplary, illustrative method for refined segmentation of the vertebral arteries, in a head-neck CT scan according to at least some embodiments of the present invention.

In Stage 4a, a starting seed is set on each side as the center of mass of the lowest slice from each side found in Stage 3v. If one blood vessel component or two are missing after Stage 3v a user aided recovery procedure is enabled and the process continues to FIG. 7g. This stage repeats itself after the recovery process, therefore in cases where this stage fails after the recovery process itself has run, the algorithm terminates with a failure.

In Stage 4b the basilar seed is set as the ending seed. In Stage 4c a histogram is filled with the HU distribution for the vertebral arteries from the Stage 3 FIG. 7a. segmentation. In Stage 4d the standard vessel tracking tool is used to segment the left and right vertebral arteries using each of left and right seeds respectively as the start seed and the basilar seed as the end seed. The local cost is the inverse of the histogram weight while avoiding marching in the carotid arteries by giving a cost of infinity to voxels belonging to the carotid arteries previously segmented.

Figure 7F:
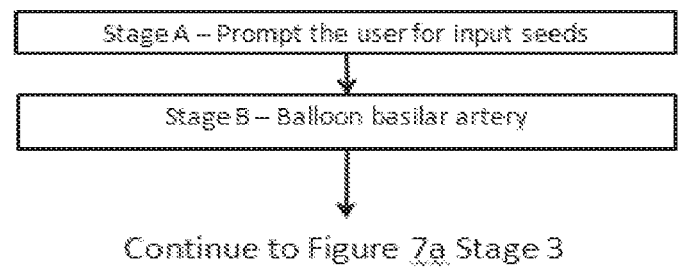
FIG. 7f is a flowchart of an exemplary, illustrative method for user aided recovery for the basilar artery segmentation and seed selection according to at least some embodiments of the present invention.

Reference is now made to FIG. 7f which is a flowchart of an exemplary, illustrative method for user aided recovery for the basilar artery segmentation and seed selection.

In Stage A the user is prompted for a seed in the basilar artery. The user is prompted for the seed in the middle slice between the skull base slice and the slice where the seeds of the MCA are located in (if they are not on the same slice then their average slice number).

In Stage B the seed is ballooned using fast marching with a local cost of 1 in the HU range 150-525 and increasing exponentially outside this range on a scale of 20 HU:

$$\text{cost} = \begin{cases} \exp[-(150 - HU)/20], & HU < 150 \\ 1, & 150 < HU < 525 \\ \exp[-(HU - 525)/20], & HU > 525 \end{cases}$$

The balloon is run in five iterations, where the seeds for each iteration are the results of the previous one. The stopping criterion for each iteration is a cost of 5. After this stage the automatic procedure is recovered and the algorithm continues is FIG. 7a Stage 3.

Figure 7G:
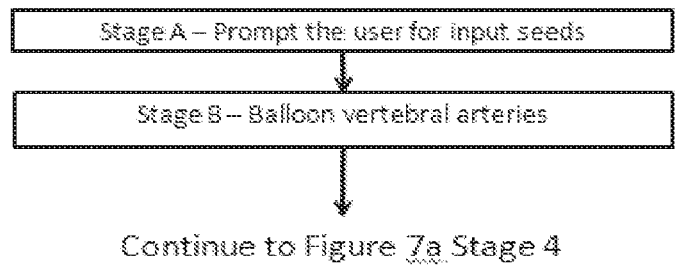
FIG. 7g is a flowchart of an exemplary, illustrative method for user aided recovery for the vertebral arteries segmentation and seed selection according to at least some embodiments of the present invention.

Reference is now made to FIG. 7g which is a flowchart of an exemplary, illustrative method for user aided recovery for the vertebral arteries segmentation and seed selection.

In Stage A the user is prompted for seeds in the vertebral arteries. In cases when only one seed is missing the user is prompted to input the other seed on the same slice where the first seed is located. If both seeds are missing then the user is prompted for a seed on the lowest slice of the ROI (FIG. 7b). If there is no ROI then the user is prompted for seeds in the slice which is located 2 cm above the top lung slice.

In Stage B the seed is ballooned using fast marching with a local cost of 1 in the HU range 150-525 growing exponentially outside this range on a scale of 20 HU:

$$\text{cost} = \begin{cases} \exp[-(150 - HU)/20], & HU < 150 \\ 1, & 150 < HU < 525 \\ \exp[-(HU - 525)/20], & HU > 525 \end{cases}$$

The balloon is run in five iterations, where the seeds for each iteration are the result of the previous one. The stopping criterion for each iteration is a cost of 5. After this stage the automatic procedure is recovered and the algorithm resumes in FIG. 7e Stage 4a.

Figure 8:
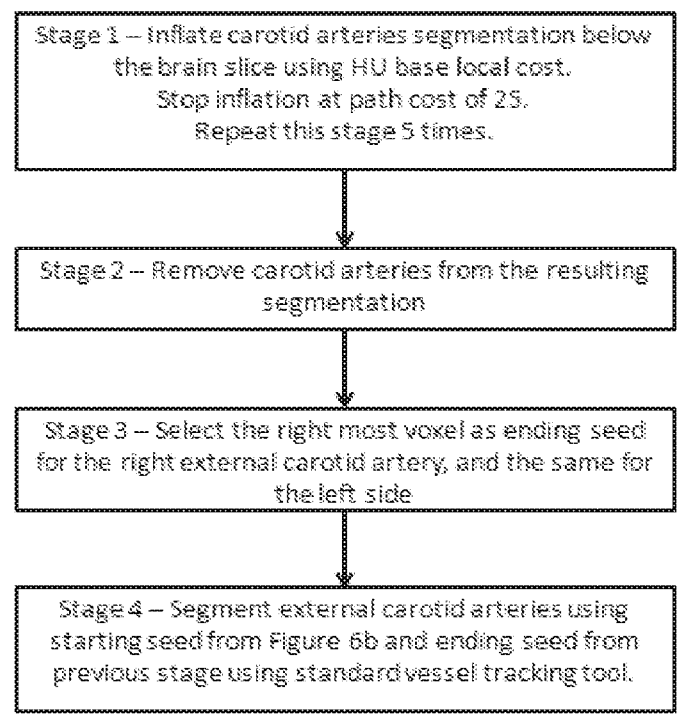
FIG. 8 is a flowchart of an exemplary, illustrative method for the external carotid arteries segmentation according to at least some embodiments of the present invention.

Reference is now made to FIG. 8 which is a flowchart of an exemplary, illustrative method for the external carotid arteries segmentation according to at least some embodiments of the present invention.

In Stage 1 the carotid arteries segmentation is inflated below the brain slice using the local cost function of the form shown in FIG. 7c Stage 2r with the carotid HU range as was derived in FIG. 3b Stage 7f with a scale of 20. The inflation is stopped at a path cost of 25. This stage is repeated 5 times. In Stage 2 the carotid arteries are removed from the resulting segmentation. In Stage 3 the right most voxel is selected as the ending seed for the right external carotid artery, and the left most voxel is selected as the ending seed for the left carotid artery. In Stage 4 the external carotid arteries are segmented using a starting seed derived as above with reference to FIG. 3a and ending seeds from the previous Stage using a standard vessel tracking tool. The cost function is derived from a histogram of the HU distribution of the voxels inside the internal carotid segmentation. The cost function is the inverse of the bin value.

Figure 9:
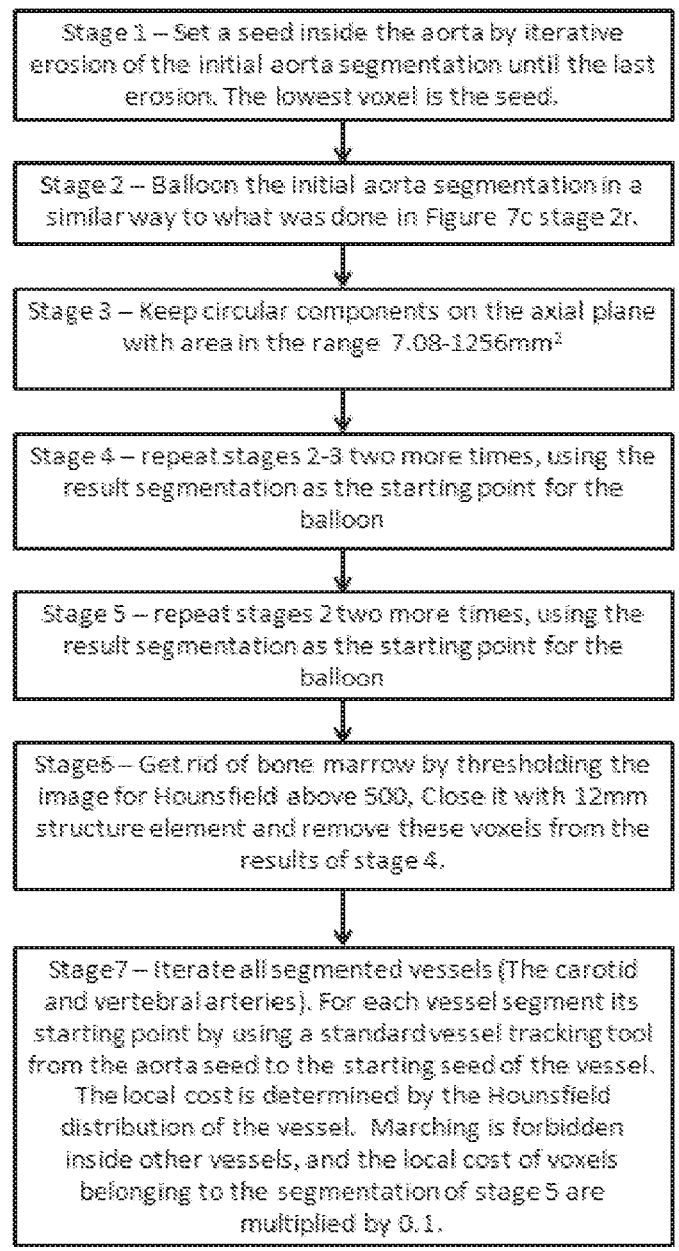
FIG. 9 is a flowchart of an exemplary, illustrative method for aorta arc segmentation, in a head-neck CT scan according to at least some embodiments of the present invention.

Reference is now made to FIG. 9 which is a flowchart of an exemplary, illustrative method for aorta arc segmentation, in a head-neck CT scan according to at least some embodiments of the present invention.

In Stage 1 a seed is set inside the aorta by iterative erosion of the initial aorta segmentation (FIG. 2d) until the last erosion. The lowest voxel is the seed. In Stage 2 the initial aorta segmentation is ballooned in a similar way to the ballooning of FIG. 7c Stage 2r. In Stage 3 circular components on the axial plane with an area in the range of 7.08-1256 mm$^2$ and 30% tolerance are kept. In Stage 4, Stages 2 and 3 are repeated two more times, using the resulting segmentation as the starting point for the ballooning. In Stage 5, Stage 2 is repeated two more times, using the resulting segmentation as the starting point for the ballooning.

In Stage 6 bone marrow is removed by thresholding the image for an HU above 500. The result is closed with a 12 mm structure element and these voxels are removed from the results of Stage 5. Stage 7 requires iteration through all segmented vessels (The carotid and vertebral arteries). For each vessel the beginning of that vessel is segmented by using a standard vessel tracking tool from the aorta seed to the starting seed of the vessel. The local cost is determined by the inverse HU distribution of the vessel. Marching is forbidden inside other vessels, and the local cost of voxels belonging to the segmentation of Stage 6 is multiplied by 0.1.

Figure 10A:
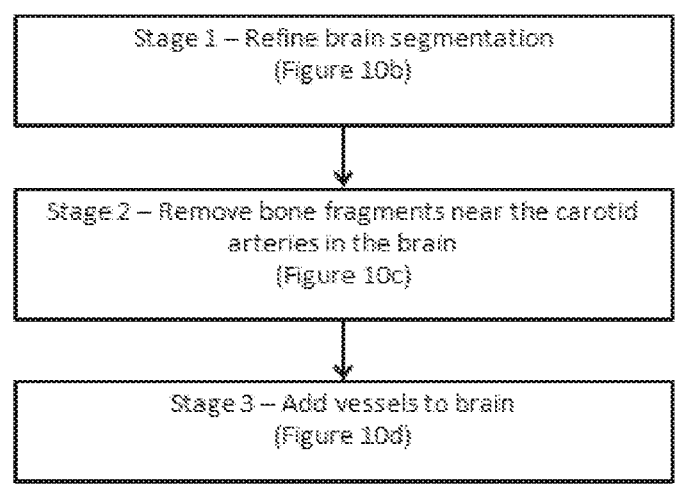
FIG. 10a is a flowchart of an exemplary, illustrative method for skull removal in a CT scan according to at least some embodiments of the present invention.

Reference is now made to FIG. 10a which is a flowchart of an exemplary, illustrative method for skull removal in a CT scan according to at least some embodiments of the present invention.

Although, this process is referred to as skull removal or segmentation, the actual process involves the segmentation of all voxels that do not belong to the brain or the arteries segmented in the previous stages. Thus, the skull, teeth, vertebral bones and all other bones in the image are segmented, along with any other non-brain soft tissue and air cavities. As described above, these segmented components can be labeled, added or removed from the image viewed in a medical image viewer such that a radiologist might view only the significant arteries of the head and neck.

In Stage 1 the brain segmentation is refined. Stage 1 is further described with reference to FIG. 10b. In Stage 2 bone fragments near the carotid arteries in the brain are removed. Stage 2 is further described with reference to FIG. 10c. In Stage 3 vessels are added to brain. Stage 3 is further described with reference to FIG. 10d. Once these stages are complete, all segmentations have been performed and these can now be displayed or hidden by the user. For example, vessels may be highlighted while the brain is hidden, allowing a medical professional to view healthy vessels or aneurisms, occlusions, or other complications in the brain vessels. FIG. 11 shows such an exemplary, illustrative screenshot of a medical image viewed in this way following completion of the segmentation algorithm.

Figure 10B:
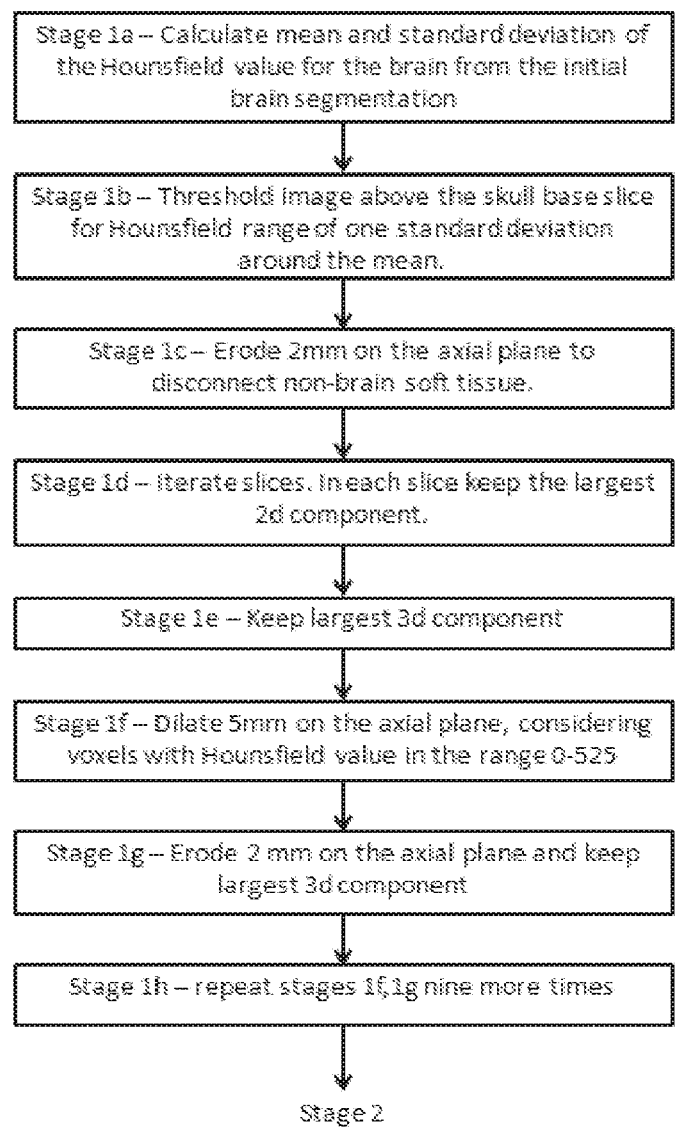
FIG. 10b is a flowchart of an exemplary, illustrative method for refining the brain segmentation in a CT scan according to at least some embodiments of the present invention.
Figure 11:
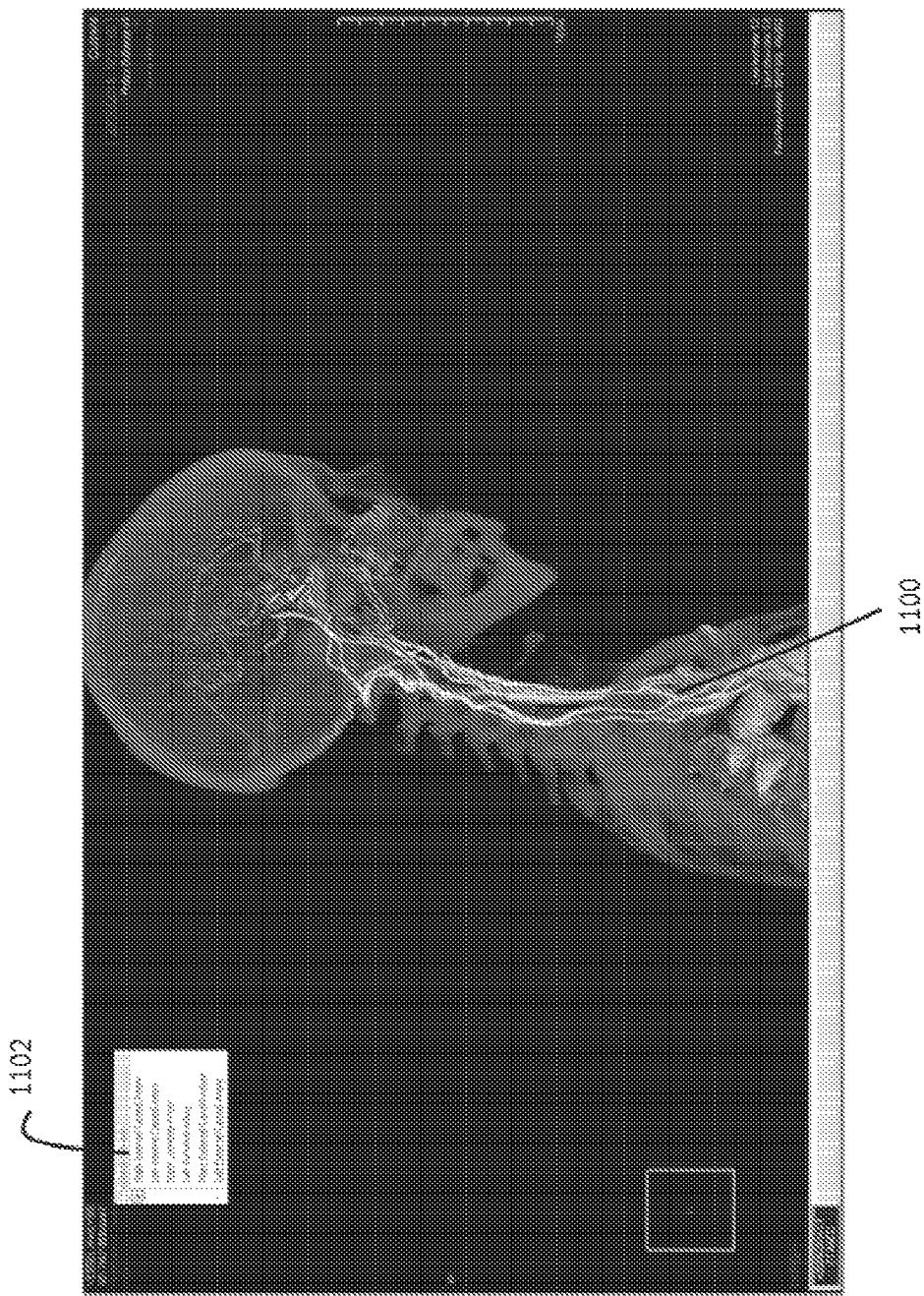
FIG. 11 is an exemplary, illustrative screenshot of a medical image viewed in a medical image viewer showing segmented arteries of the head and neck according to at least some embodiments of the present invention.

Reference is now made to FIG. 10b which is a flowchart of an exemplary, illustrative method for refining the brain segmentation in a CT scan according to at least some embodiments of the present invention.

In Stage 1a the mean and standard deviations of the Hounsfield value for the brain from the initial brain segmentation are calculated. In Stage 1b the image above the skull base slice is thresholded for the HU range of one standard deviation around the mean. In Stage 1c the result is eroded 2 mm on the axial plane to disconnect non-brain soft tissue. In Stage 1d the algorithm goes through each slice and keeps the largest 2d component.

In Stage 1e the largest 3d component is kept. In Stage 1f the result is dilated 5 mm on the axial plane, considering voxels with HU values in the range 0-525. In Stage 1g the result is eroded 2 mm on the axial plane and the largest 3d component is kept. In Stage 1h, Stages 1f and 1g are repeated nine more times each time with the result of the previous iteration.

Figure 10C:
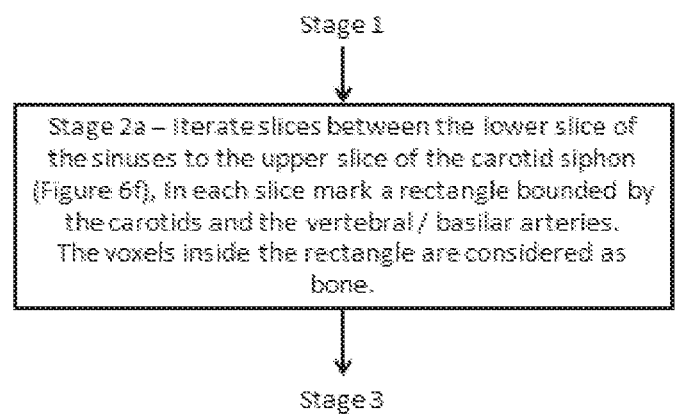
FIG. 10c is a flowchart of an exemplary, illustrative method for removal of bone fragments near the carotid arteries in the brain in a CT scan according to at least some embodiments of the present invention.

Reference is now made to FIG. 10c which is a flowchart of an exemplary, illustrative method for removal of bone fragments near the carotid arteries in the brain in a CT scan according to at least some embodiments of the present invention. In Stage 2a the algorithm goes through the slices between the lower slice of the sinuses and the upper slice of the carotid siphon (as derived with reference to FIG. 60. For each slice a rectangle is marked bounded by the carotids and the vertebral/basilar arteries. The voxels inside the rectangle are considered as bone.

Figure 10D:
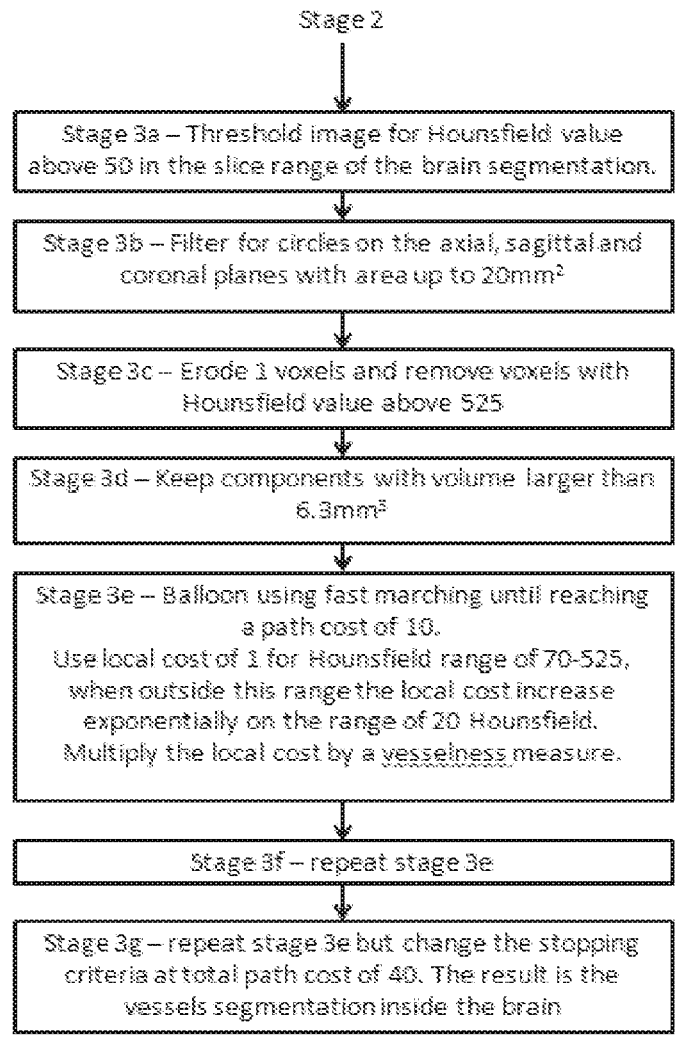
FIG. 10d is a flowchart of an exemplary, illustrative method for adding vessels to the brain in a CT scan according to at least some embodiments of the present invention.

Reference is now made to FIG. 10d which is a flowchart of an exemplary, illustrative method for adding vessels to the brain in a CT scan according to at least some embodiments of the present invention.

In Stage 3a the image is thresholded for HU values above 50 in the slice range of the brain segmentation (FIG. 2c). In Stage 3b a filter is applied for circles on the axial, sagittal and coronal planes with area up to 20 mm² and 30% tolerance. In Stage 3c the result is eroded by 1 voxel and voxels with Hounsfield value above 525 are removed. In Stage 3d blood vessel components with volume larger than 6.3 mm³ are kept.

In Stage 3e the result is ballooned using fast marching until reaching a path cost of 10. A local cost of 1 is used for the HU range of 70-525. When outside this range, the local cost increase exponentially in the range of 20 Hounsfield.

$$\text{cost} = \begin{cases} \exp[-(70-HU)/20], & HU < 70 \\ 1, & 70 < HU < 525 \\ \exp[-(HU-525)/20], & HU > 525 \end{cases}$$

The local cost is multiplied by a vesselness measure. The vesselness is a measure score from 0 to 1 indicating how vessel-like a voxel is. It is calculated from the Hessian. Marking x1, x2, and x3 as the eigenvalues of the Hessian (x1>x2>x3) which is calculated with a Gaussian filter with a scale of 4 mm.

$$\text{Vesselness} = \text{Sigmoid}(x1*0.2)*\text{Sigmoid}(x1*0.2)$$

Where Sigmoid is the standard sigmoid function as is known in the art.

In Stage 3f, Stage 3e is repeated. In Stage 3g, Stage 3e is repeated but the stopping criteria is changed at a total path cost of 40. The result is vessel segmentation inside the brain Reference is now made to FIG. 11 which is an exemplary, illustrative screenshot of a medical image viewed in a medical image viewer showing segmented arteries of the head and neck according to at least some embodiments of the present invention. In FIG. 11, the segmented arteries 1100 are highlighted and a drop-down list 1102 allows a radiologist to highlight a specific segmented artery.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, including but not limited to any type of personal computer (PC), a server, a cellular telephone, an IP telephone, a smart phone, a PDA (personal digital assistant), or a pager. Any two or more of such devices in communication with each other may optionally comprise a "computer network".

While the invention has been described with respect to a limited number of embodiments, it will be appreciated that many variations, modifications and other applications of the invention may be made.

What is claimed is:

1. A system for segmentation of a blood vessel of a subject in a medical image wherein the medical image comprises a plurality of slices, the system comprising a processor for executing the steps of:
   automatically identifying a plurality of landmark slices in the plurality of slices, the plurality of landmark slices containing each anatomical landmark of one or more anatomical landmarks in the medical image;
   automatically identifying relevant landmark slices for finding the blood vessel based on positional relationships of the landmarks and the blood vessel;
   automatically prompting for manual identification of a seed for the blood vessel in response to being unable to automatically identify a blood vessel component;
   receiving an input indicative of manual identification of the seed for the blood vessel from within a set of slices that is constrained to the relevant landmark slices; and
   automatically segmenting the blood vessel based on the input indicative of manual identification of the seed for the blood vessel from within a set of slices that is constrained to the relevant landmark slices.

2. The system according to claim 1, wherein the landmarks comprise at least one of the lungs, trachea, brain, skull, or segmented blood vessels.

3. The system according to claim 1, wherein the seed includes a first seed in a first blood vessel at a first position and a second seed in a blood vessel at a second position.

4. The system according to claim 3, further comprising:
   ballooning the first and second seeds using a fast marching tool that has a predetermined local cost in a Hounsfield unit range between one hundred and fifty and five hundred and twenty-five.

5. The system according to claim 4, wherein the fast marching tool has an exponential cost outside the one hundred and fifty to five hundred and twenty-five as at a scale of twenty.

6. The system according to claim 5, wherein the balloon runs repeatedly for multiple iterations.

7. The system according to claim 6, wherein the first and second seeds for each iteration are a result of a previous iteration and a stopping criteria is a path cost of five.

8. The system according to claim 1, further comprising:
   automatically identifying a first seed in a first blood vessel, wherein the prompt for the seed is for a second seed in a second blood vessel at a same slice where the first seed in the first blood vessel is identified.

9. The system according to claim 1, wherein the prompt for the seed is a prompt for a seed on a lowest slice of a region of interest.

10. The system according to claim 1, wherein the prompt for the seed is a prompt for a seed in a slice which is located two centimeters above a top lung slice.

11. The system according to claim 1, wherein the prompt for the seed is part of user aided recovery of the segmentation of the blood vessel.

12. The system according to claim 1, wherein the prompt for the seed is part of user aided recovery of seed selection.

13. The system according to claim 1, wherein the seed includes a first seed in a first common carotid at a first position of two centimeters above a lung slice and a second seed in a second common carotid at a second position of two centimeters above a lung slice.

14. The system according to claim 1, further comprising:
   automatically identifying a first seed in a first common carotid, wherein the prompt for the seed is for a second seed in a second common carotid at a same slice where the first seed in the first common carotid is identified.

15. The system according to claim 1, wherein the prompt for the seed is for seeds in middle cerebral arteries in a slice of 1.5 centimeters below a slice with a largest cross section in a brain segmentation.

16. The system according to claim 1, further comprising:
   automatically identifying a first seed in middle cerebral arteries, wherein the prompt for the seed is for a second seed in the middle cerebral arteries at a same slice where the first seed in the middle cerebral arteries is identified.

17. The system according to claim 1, wherein the prompt of the seed is for seeds in a basilar artery in a middle slice between a skull base slice and a slice where seeds of middle cerebral arteries are located.

18. The system according to claim 17, wherein the prompt of the seed is for seeds in a basilar artery in an average of a middle slice between a skull base slice and a slice where seeds of middle cerebral arteries are located.

19. The system according to claim 1, wherein the prompt for the seed is for seeds in vertebral arteries and includes a seed on a lowest slice of a region of interest.

20. The system according to claim 1, further comprising:
   automatically identifying a first seed in vertebral arteries, wherein the prompt for the seed is for a second seed in the vertebral arteries at a same slice where the first seed in the vertebral arteries is identified.

* * * * *